United States Patent
Fujie

(10) Patent No.: US 11,667,800 B2
(45) Date of Patent: Jun. 6, 2023

(54) INK JET TEXTILE PRINTING INK SET, INK JET TEXTILE PRINTING SYSTEM, AND INK JET TEXTILE PRINTING METHOD

(71) Applicant: Seiko Epson Corporation, Tokyo (JP)

(72) Inventor: Toshihiro Fujie, Suwa (JP)

(73) Assignee: SEIKO EPSON CORPORATION

( * ) Notice: Subject to any disclaimer, the term of this patent is extended or adjusted under 35 U.S.C. 154(b) by 700 days.

(21) Appl. No.: 16/727,030

(22) Filed: Dec. 26, 2019

(65) Prior Publication Data

US 2020/0207998 A1 Jul. 2, 2020

(30) Foreign Application Priority Data

Dec. 27, 2018 (JP) .............................. JP2018-244250

(51) Int. Cl.
| | |
|---|---|
| *C09D 11/322* | (2014.01) |
| *C09D 11/40* | (2014.01) |
| *C08K 5/19* | (2006.01) |
| *C08L 75/04* | (2006.01) |
| *D06P 5/30* | (2006.01) |
| *B41J 11/00* | (2006.01) |

(52) U.S. Cl.
CPC .............. *C09D 11/322* (2013.01); *C08K 5/19* (2013.01); *C08L 75/04* (2013.01); *C09D 11/40* (2013.01); *D06P 5/30* (2013.01); *B41J 11/00* (2013.01)

(58) Field of Classification Search
CPC ........ B41J 11/00; C09D 11/40; C09D 11/322; C08K 5/19; C08L 75/04; D06P 5/30
See application file for complete search history.

(56) References Cited

U.S. PATENT DOCUMENTS

| | | | |
|---|---|---|---|
| 8,382,271 B2* | 2/2013 | Goto ..................... | C09D 11/326 347/100 |
| 9,827,778 B2* | 11/2017 | Ishikawa .................... | B41J 2/18 |
| 2011/0102497 A1 | 5/2011 | Sato et al. | |
| 2011/0200751 A1 | 8/2011 | Yatake | |
| 2019/0366714 A1 | 12/2019 | Tsukahara et al. | |
| 2019/0366717 A1 | 12/2019 | Tsukahara et al. | |

FOREIGN PATENT DOCUMENTS

| | | |
|---|---|---|
| JP | 2011-168911 A | 9/2011 |
| JP | 2018-053170 A | 4/2018 |
| JP | 2018-103602 A | 7/2018 |
| WO | 2009-084600 A1 | 7/2009 |

* cited by examiner

*Primary Examiner* — Thinh H Nguyen
(74) *Attorney, Agent, or Firm* — Harness, Dickey & Pierce, P.L.C.

(57) ABSTRACT

An ink jet textile printing ink set of the present disclosure includes an ink composition and a process liquid composition, wherein the process liquid composition contains a cationic compound and a compound having one quaternary ammonium in its molecule, and the ink composition contains a pigment and an organic solvent, where the organic solvent is a polyhydric alcohol solvent and the content thereof is 10.0 mass % or more and 55.0 mass % or less.

9 Claims, 3 Drawing Sheets

INK JET TEXTILE PRINTING INK SET, INK JET TEXTILE PRINTING SYSTEM, AND INK JET TEXTILE PRINTING METHOD

The present application is based on, and claims priority from, JP Application Serial Number 2018-244250, filed Dec. 27, 2018, the disclosure of which is hereby incorporated by reference herein in its entirety.

BACKGROUND

1. Technical Field

The present disclosure relates to an ink jet textile printing ink set, an ink jet textile printing system, and an ink jet textile printing method.

2. Related Art

Textile printing for recording images on fabric, such as woven fabric, knitted fabric, and nonwoven fabric, are known. In recent years, for example, from the viewpoint of capable of efficiently utilizing an ink composition (hereinafter, also referred to as "ink") for textile printing, it has been investigated to use an ink jet recording system also in textile printing. In this ink jet textile printing using the ink jet recording system, ink droplets are discharged from nozzles of an ink jet head and adhere to fabric to form an image of an ink coating film on the fabric.

In ink jet textile printing, when fabric is dyed with a color material, a technique of pretreating the fabric with process liquid including, for example, a cationic compound for improving the color development properties of a pigment used as the color material and reducing generation of blur is known (e.g., JP-A-2011-168911).

In ink jet textile printing using an ink jet textile printing ink composition containing a pigment, it is desired to further improve the color development properties.

SUMMARY

1. The present disclosure provides an ink jet textile printing ink set including an ink composition and a process liquid composition, in which the process liquid composition contains a cationic compound and a compound having one quaternary ammonium in its molecule, and the ink composition contains a pigment and an organic solvent, where the organic solvent is a polyhydric alcohol solvent and the content thereof is 10.0 mass % or more and 55.0 mass % or less.

2. In the ink jet textile printing ink set described in the above 1, the content of the compound having one quaternary ammonium in its molecule is 3.5 mass % or more and 11.0 mass % or less based on the total mass of the process liquid composition.

3. In the ink jet textile printing ink set described in the above 1 or 2, the content mass ratio of the cationic compound to the compound having one quaternary ammonium in its molecule is 0.7 or more and 2.3 or less.

4. In the ink jet textile printing ink set described in any one of the above 1 to 3, the ink composition further contains resin particles.

5. In the ink jet textile printing ink set described in the above 4, the resin particles contained in the ink composition are particles of a polycarbonate urethane resin.

6. In the ink jet textile printing ink set described in any one of the above 1 to 5, the ink composition contains 1.0 mass % or more and 45.0 mass % or less of a solvent having a boiling point of 210° C. or more as the polyhydric alcohol solvent.

7. In the ink jet textile printing ink set described in any one of the above 1 to 6, the compound having one quaternary ammonium in its molecule is a betaine.

8. In the ink jet textile printing ink set described in the above 7, the compound having one quaternary ammonium in its molecule is trimethylglycine.

9. In the ink jet textile printing ink set described in any one of the above 1 to 8, the ink jet textile printing ink set is used for recording on cotton fabric.

10. The present disclosure further provides an ink jet textile printing system including a process liquid adhesion unit that adheres a process liquid composition containing a cationic compound and a compound having one quaternary ammonium in its molecule to fabric, and an ink jet textile printing apparatus that includes an ink jet head including a nozzle for discharging an ink composition containing a pigment and an organic solvent, where the organic solvent is a polyhydric alcohol solvent and the content thereof is 10.0 mass % or more and 55.0 mass % or less, to adhere the ink composition to the fabric and a circulation passage for circulating the ink composition.

11. The present disclosure further provides an ink jet textile printing method including a process liquid adhesion step of adhering a process liquid composition containing a cationic compound and a compound having one quaternary ammonium in its molecule to fabric, and an ink adhesion step of discharging an ink composition containing a pigment and an organic solvent from a nozzle of an ink jet head to adhere the ink composition to the fabric, where the organic solvent is a polyhydric alcohol solvent and the content thereof is 10.0 mass % or more and 55.0 mass % or less.

DESCRIPTION OF EXEMPLARY EMBODIMENTS

Figure 1:
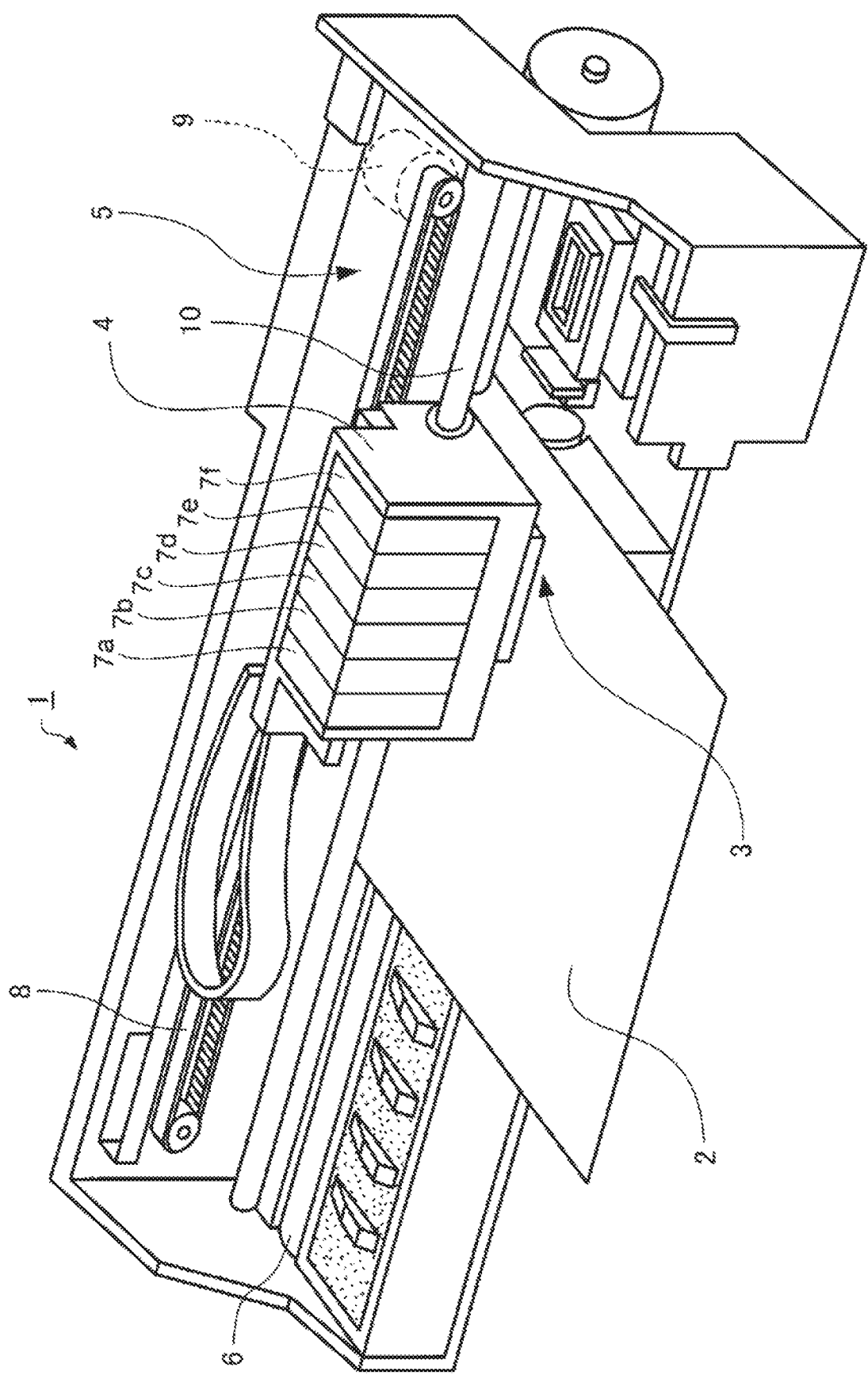
FIG. 1 is a schematic perspective view of an ink jet textile printing apparatus for performing the ink jet textile printing method according to an embodiment of the present disclosure.

Some embodiments of the present disclosure will now be described. The embodiments shown below merely describe examples of the present disclosure. The present disclosure is not limited to the following embodiments and encompasses various modifications implemented within a range not changing the gist of the present disclosure. Incidentally, not all the components described below are indispensable components of the present disclosure.

An aspect of the ink jet textile printing ink set according to this embodiment is characterized by including an ink composition and a process liquid composition, wherein the process liquid composition contains a cationic compound and a compound having one quaternary ammonium in its molecule, and the ink composition contains a pigment and an organic solvent, where the organic solvent is a polyhydric alcohol solvent and the content thereof is 10.0 mass % or more and 55.0 mass % or less.

An aspect of the ink jet textile printing system according to the embodiment is characterized by including a process liquid adhesion device that adheres a process liquid composition containing a cationic compound and a compound having one quaternary ammonium in its molecule to fabric and an ink jet textile printing apparatus that comprises an ink jet head including a nozzle for discharging an ink composition containing a pigment and an organic solvent, where the organic solvent is a polyhydric alcohol solvent and the content thereof is 10.0 mass % or more and 55.0 mass % or less, to adhere the ink composition to the fabric and a circulation passage for circulating the ink composition.

An aspect of the ink jet textile printing method according to the embodiment is characterized by including a process liquid adhesion step of adhering a process liquid composition containing a cationic compound and a compound having one quaternary ammonium in its molecule to fabric; and an ink adhesion step of discharging an ink composition containing a pigment and an organic solvent from a nozzle of an ink jet head to adhere the ink composition to the fabric, where the organic solvent is a polyhydric alcohol solvent and the content thereof is 10.0 mass % or more and 55.0 mass % or less.

Regarding the ink jet textile printing ink set, the ink jet textile printing system, and the ink jet textile printing method according to the embodiments, the configuration of the ink jet textile printing system, the ink jet textile printing ink composition (hereinafter, also referred to as "ink composition" or "ink"), the process liquid composition, the ink jet textile printing ink set (hereinafter, also referred to as "ink set"), the fabric for the ink jet textile printing, and the ink jet textile printing method will now be described in turn.

1. INK JET TEXTILE PRINTING SYSTEM

The ink jet textile printing system according to the embodiment is characterized by including a process liquid adhesion device that adheres a process liquid composition containing a cationic compound and a compound having one quaternary ammonium in its molecule to fabric and an ink jet textile printing apparatus that comprises an ink jet head including a nozzle for discharging an ink composition containing a pigment and an organic solvent, where the organic solvent is a polyhydric alcohol solvent and the content thereof is 10.0 mass % or more and 55.0 mass % or less, to adhere the ink composition to the fabric and a circulation passage for circulating the ink composition.

In the embodiment, the process liquid adhesion device may be provided to the ink jet textile printing apparatus or may be provided separately from the ink jet textile printing apparatus. In the embodiment, an example of ink jet application using the process liquid adhesion device provided to the ink jet textile printing apparatus will be described. The ink jet application can uniformly adhere the process liquid composition to fabric. Examples of another process liquid adhesion device include an immersion device in which fabric is immersed in the process liquid composition, a roller in which the process liquid composition is applied with, for example, a roll coater, and a spray in which the process liquid composition is ejected by, for example, a spray device.

In addition, the ink jet textile printing apparatus that is used in the embodiment will be described using an on-carriage type printer in which an ink cartridge is loaded on a carriage as an example. In the embodiment, the ink jet textile printing apparatus is not limited to the on-carriage type printer and may be an off-carriage type printer in which an ink cartridge is fixed to the outside.

Incidentally, the printer that is used in the description below is a serial printer including a recording ink jet head loaded on a carriage that moves in a predetermined direction and discharging droplets on a recording medium by movement of the ink jet head according to the movement of the carriage. The ink jet textile printing apparatus used in the present disclosure is not limited to the serial printer and may be a line printer. In the line printer, the ink jet head is wider than the width of recording media, and the ink jet head discharges droplets on a recording medium without moving.

An example of the ink jet textile printing apparatus used in the embodiment will now be described with reference to the drawings. The ink jet textile printing apparatus used in the embodiment is not limited to the following aspects. In each drawing used in the following description, the scale of each member is appropriately changed in order to make each member a recognizable size.

The ink jet textile printing apparatus is an apparatus for performing textile printing by landing droplets on fabric by an ink jet method discharging micro-droplets of an ink composition. FIG. 1 is a schematic perspective view illustrating an ink jet textile printing apparatus used in an embodiment.

As shown in FIG. 1, the printer 1 in the embodiment includes an ink jet head 3, a carriage 4, a main scanning mechanism 5, a platen roller 6, and a controller (not shown) for controlling the operation of the whole printer 1. The carriage 4 carries the ink jet head 3 and detachably carries ink cartridges 7a, 7b, 7c, 7d, 7e, and 7f containing ink compositions to be supplied to the ink jet head 3.

The main scanning mechanism 5 includes a timing belt 8 connected to the carriage 4, a motor 9 for driving the timing belt 8, and a guide shaft 10. The guide shaft 10 lays as a supporting member for the carriage 4 in the scanning direction of the carriage 4, i.e., in the main scanning direction. The carriage 4 is driven by the motor 9 via the timing belt 8 and can be reciprocated along the guide shaft 10. Consequently, the main scanning mechanism 5 has a function of reciprocating the carriage 4 in the main scanning direction.

The platen roller 6 has a function of transporting fabric 2 for textile printing in a sub-scanning direction orthogonal to the main scanning direction, i.e., in the longitudinal direction of the fabric 2. Consequently, the fabric 2 is transported in the sub-scanning direction. The carriage 4 carrying the ink jet head 3 can be reciprocated in the main scanning direction which approximately corresponds to the width direction of the fabric 2, and the ink jet head 3 is configured to be able to scan the fabric 2 in the main scanning direction and the sub-scanning direction.

The ink cartridges 7a, 7b, 7c, 7d, 7e, and 7f are independent six ink cartridges. The ink cartridges 7a, 7b, 7c, 7d, 7e, and 7f can contain ink compositions constituting an ink set according to the embodiment. These ink cartridges individually contain ink compositions having colors, such as black, cyan, magenta, yellow, white, and orange, in an arbitrary combination. In FIG. 1, the number of ink cartridges is six but is not limited thereto. The bottoms of the ink cartridges 7a, 7b, 7c, 7d, 7e, and 7f are provided with supply ports (not shown) for supplying the ink compositions contained in each ink cartridge to the ink jet head 3. In addition, in the embodiment, one of the ink cartridges 7a, 7b, 7c, 7d, 7e, and 7f can contain process liquid.

The ink jet head 3 is a means for ejecting inks supplied from the ink cartridges 7a, 7b, 7c, 7d, 7e, and 7f from multiple nozzles N and adhering the inks to fabric 2 under control by the controller (not shown). The ink jet head 3 includes multiple nozzles (see FIG. 2) on the side facing fabric 2 to which inks are adhered, the nozzles discharging ink or process liquid to adhere them to the fabric 2. These nozzles are arranged in a line to form nozzle lines, and the nozzle lines are individually arranged to correspond to the color ink compositions and the process liquid. The ink compositions and the process liquid are supplied to the ink jet head 3 from the respective ink cartridges and are discharged as droplets from the nozzles by the actuator (not shown) in the ink jet head 3. The discharged droplets of the ink compositions and process liquid land on the fabric 2 to pretreat the fabric 2 and to form an image, text, pattern, color, etc. by the ink in the textile printing region of the fabric 2.

Here, the ink jet head 3 uses a piezoelectric element as the actuator serving as a driving means but is not limited to this system. For example, an electromechanical conversion element that displaces a diaphragm as the actuator by electrostatic adsorption or an electrothermal conversion element that discharges an ink composition as droplets by air bubbles generated by heating may be used.

In the embodiment, the ink jet head 3 may be a head having a circulation passage for circulating the ink composition. In such a case, even if ink that tends to generate foreign matter is used, it is possible to provide a textile printing method having excellent discharge stability.

Figure 2:
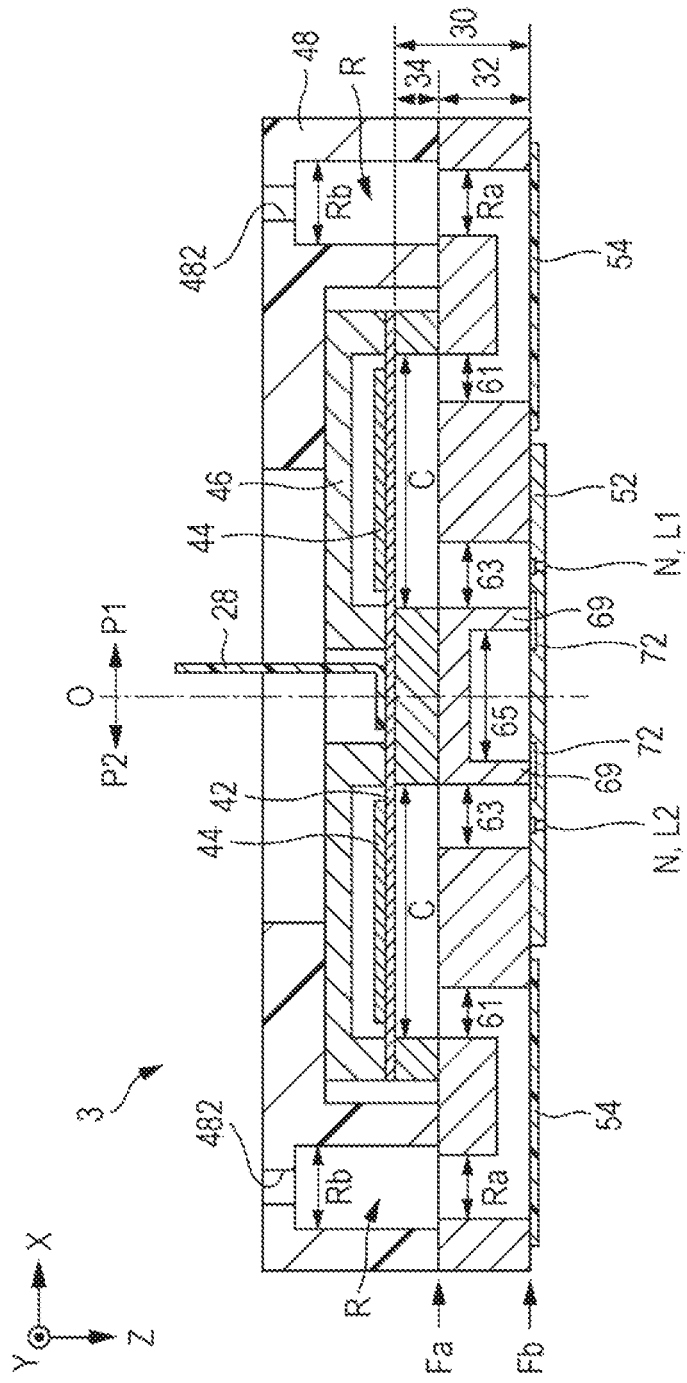
FIG. 2 is a cross-sectional view of the ink jet head of the ink jet textile printing apparatus.
Figure 3:
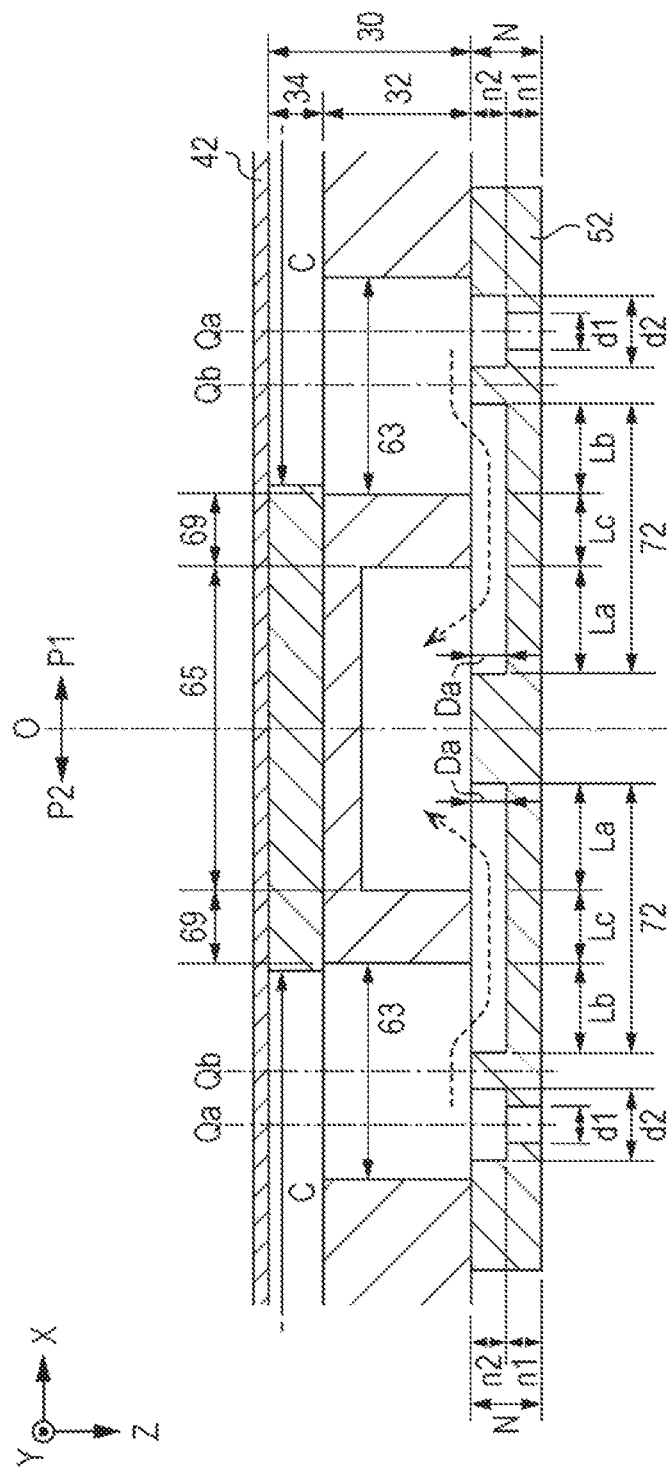
FIG. 3 is a cross-sectional view of the vicinity of a circulation liquid chamber in the ink jet head.

FIG. 2 is a cross-sectional view of the ink jet head 3 in a cross-section perpendicular to the Y-direction, and FIG. 3 is a partial exploded perspective view of the ink jet head 3. In FIG. 2, for example, a plane parallel to the surface of the fabric 2 is referred to as an X-Y plane, and a direction perpendicular to the X-Y plane is referred to as a Z direction hereinafter. The ejection direction of ink by the ink jet head 3 corresponds to the Z direction. The main scanning direction corresponds to the X direction, and a direction (sub-scanning direction) orthogonal to the main scanning direction corresponds to the Y direction.

The multiple nozzles N of the ink jet head 3 are arranged in the Y direction to constitute a nozzle line. In the ink jet head 3, a plane passing through a central axis parallel to the Y direction and being parallel to the Z direction, i.e., the Y-Z plane O is referred to as "central plane" in the following description.

As shown in FIG. 2, the ink jet head 3 has a configuration in which elements related to each nozzle N of a first line L1 and elements related to each nozzle N of second line L2 are arranged symmetrically with respect to the central plane O. That is, in the ink jet head 3, the configurations of the part on the positive side (hereinafter, also referred to as "first portion") P1 in the X direction and the part on the negative side (hereinafter, also referred to as "second portion") P2 in the X direction are substantially the same with respect to the central plane O. The multiple nozzles N of the first line L1 are formed in the first portion P1, and the multiple nozzles N of the second line L2 are formed in the second portion P2. The central plane O corresponds to the interface between the first portion P1 and the second portion P2.

As shown in FIG. 2, the ink jet head 3 includes a flow channel forming portion 30. The flow channel forming portion 30 is a structure that forms a flow channel for supplying ink to multiple nozzles N. In the embodiment, the flow channel forming portion 30 is constituted by laminating a first flow channel substrate 32 and a second flow channel substrate 34. The first flow channel substrate 32 and the second flow channel substrate 34 are each a plate-like member being long in the Y direction. The second flow channel substrate 34 is disposed on the surface Fa of the first flow channel substrate 32 on the negative side in the Z direction with, for example, an adhesive.

As shown in FIG. 2, in addition to the second flow channel substrate 34, a vibrating portion 42, multiple piezoelectric elements 44, a protection member 46, and a housing 48 are disposed on the surface Fa of the first flow channel substrate 32. On the other hand, on the positive side in the Z direction of first flow channel substrate 32, i.e., on the surface Fb opposite to the surface Fa, a nozzle plate 52 and a vibration absorber 54 are disposed. The elements of the ink jet head 3 are each schematically a plate-like member being long in the Y direction, as in the first flow channel substrate 32 and the second flow channel substrate 34, and are bonded to each other with, for example, an adhesive. It is also possible to comprehend that the direction in which the first flow channel substrate 32 and the second flow channel substrate 34 are stacked, the direction in which the first flow channel substrate 32 and the nozzle plate 52 are stacked, or the direction perpendicular to the surface of each plate-like element is the Z direction.

The nozzle plate 52 is a plate-like member provided with multiple nozzles N and is disposed on the surface Fb of the first flow channel substrate 32 with, for example, an adhesive. Each of the nozzles N is a circular through hole through which ink passes. In the nozzle plate 52 of a first embodiment, multiple nozzles N constituting a first line L1 and multiple nozzles N constituting a second line L2 are formed. Specifically, the multiple nozzles N of the first line L1 are formed along the Y direction in the region on the positive side in the X direction of the nozzle plate 52 when viewed from the central plane O, and the multiple nozzles N of the second line L2 are formed along the Y direction in the region on the negative side in the X direction. The nozzle plate 52 is a single plate-like member continuing over the portion in which the multiple nozzles N of the first line L1 are formed and the portion in which the multiple nozzles N of the second line L2 are formed. The nozzle plate 52 is manufactured by a semiconductor manufacturing technique, for example, by processing a single-crystal substrate of silicon by a processing technique, such as dry etching or wet etching. However, the nozzle plate 52 can be manufactured arbitrarily using known materials and manufacturing methods.

As shown in FIG. 2, in the first flow channel substrate 32, a space Ra, multiple supply channels 61, and multiple communication passages 63 are formed in each of the first portion P1 and the second portion P2. The space Ra is an opening formed so as to be long along the Y direction in planar view, i.e., when viewed from the Z direction, and the supply channels 61 and the communication passages 63 are through holes formed for each nozzle N. The multiple communication passages 63 are arranged in the Y direction in planar view, and the multiple supply channels 61 are arranged between the array of the communication passages 63 and the space Ra in the Y direction. The multiple supply channels 61 communicate in common with the space Ra. In addition, one arbitrary communication passage 63 overlaps a nozzle N corresponding to the communication passage 63 in planar view. Specifically, one arbitrary communication passage 63 in the first portion P1 communicates with one nozzle N in the first line L1 corresponding to the communication passage 63. Similarly, one arbitrary communication passage 63 in the second portion P2 communicates with one nozzle N in the second line L2 corresponding to the communication passage 63.

As shown in FIG. 2, the second flow channel substrate 34 is a plate-like member provided with multiple pressure chambers C in each of the first portion P1 and the second portion P2. The pressure chambers C are arranged in the Y direction. The pressure chambers C are each a space formed for each of the nozzles N and being long in the X direction in planar view. The first flow channel substrate 32 and the second flow channel substrate 34 are manufactured by, for example, processing a single-crystal substrate of silicon by a semiconductor manufacturing technique, as in the above-described nozzle plate 52. However, the first flow channel substrate 32 and the second flow channel substrate 34 can be manufactured arbitrarily using known materials and manufacturing methods. As exemplified above, the flow channel forming portion 30 and the nozzle plate 52 in the first embodiment encompass substrates made of silicon. Accordingly, for example, there is an advantage that minute flow channels can be formed with high precision in the flow channel forming portion 30 and the nozzle plate 52 by a semiconductor manufacturing technique as exemplified above.

As shown in FIG. 2, a vibrating portion 42 is disposed on the surface of the second flow channel substrate opposite to the first flow channel substrate 32. The vibrating portion 42 of the first embodiment is a plate-like member that is capable of elastically vibrating. Incidentally, the second flow channel substrate 34 and the vibrating portion 42 can also be integrally formed by selectively removing a part of the plate-like member having a predetermined thickness in the thickness direction in the region corresponding to the pressure chamber C.

As shown in FIG. 2, the surface Fa of the first flow channel substrate 32 and the vibrating portion 42 face each other with an interval in the inside of each pressure chamber C. The pressure chamber C is a space located between the surface Fa of the first flow channel substrate and the vibrating portion 42 and generates a change in the pressure of the ink filled in the space. The pressure chambers C are each a space whose longitudinal direction is, for example, the X direction, and are formed for each nozzle N. In each of the first line L1 and the second line L2, multiple pressure chambers C are arranged in the Y direction. As shown in FIG. 2, the end of one arbitrary pressure chamber C on the central plane O side overlaps the communication passage 63 in planar view, and the end on the opposite side to the central plane O overlaps the supply channel 61 in planar view. Accordingly, in each of the first portion P1 and the second portion P2, the pressure chamber C is communicated with the nozzle N through the communication passage 63 and is also communicated with the space Ra through the supply channel 61. Incidentally, it is also possible to add a predetermined flow channel resistance by forming a throttle flow channel having a narrowed flow channel width in the pressure chamber C.

As shown in FIG. 2, on the surface of the vibrating portion 42 on the opposite side to the pressure chamber C, multiple piezoelectric elements 44 corresponding to different nozzles N are disposed in each of the first portion P1 and the second portion P2. The piezoelectric elements 44 are passive elements that are deformed by supply of a driving signal. The multiple piezoelectric elements 44 are arranged in the Y direction so as to correspond to each pressure chamber C. One arbitrary piezoelectric element 44 is, for example, a laminate in which a piezoelectric layer intervenes between two electrodes facing each other. Incidentally, it is also possible to define the part deforming by supply of a driving signal, i.e., an active portion vibrating the vibrating portion 42 as the piezoelectric element 44. In the embodiment, when the vibrating portion 42 vibrates in conjunction with deformation of the piezoelectric elements 44, the pressure in the pressure chamber C varies. Consequently, the ink filling the pressure chamber C passes through the communication passage 63 and the nozzle N and is ejected.

The protection member 46 in FIG. 2 is a plate-like member for protecting the multiple piezoelectric elements 44 and is disposed on the surface of the vibrating portion 42 or the surface of the second flow channel substrate 34. Although the material and the manufacturing method for the protection member 46 are arbitrary, the protection member 46 can be formed by, for example, processing a single-crystal substrate of silicon by a semiconductor manufacturing technique as in the first flow channel substrate 32 and the second flow channel substrate 34. The multiple piezoelectric elements 44 can be accommodated in a recess formed on the surface of the protection member 46 on the vibrating portion 42 side.

An end of a wiring substrate 28 is bonded to the surface of the vibrating portion 42 on the opposite side to the flow channel forming portion 30 or the surface of the flow channel forming portion 30. The wiring substrate 28 is a flexible mounting part in which multiple wirings (not shown) electrically connecting a control unit 20 and an ink jet head 3 are formed. An end of the wiring substrate 28 passing through an opening formed in the protection member 46 and an opening formed in the housing 48 and extending to the outside is connected to the control unit 20. For example, a flexible printed circuit (FPC) or a flexible flat cable (FFC) is suitably used as the flexible wiring substrate 28.

The housing 48 is a case for storing ink that is supplied to the multiple pressure chambers C and further to the multiple nozzles N. The surface of the housing 48 on the positive side in the Z direction is bonded to the surface Fa of the first flow channel substrate 32 with, for example, an adhesive. In manufacturing of the housing 48, a known technique or a manufacturing method can be arbitrarily employed. For example, the housing 48 can be formed by injection molding of a resin material.

As shown in FIG. 2, a space Rb is formed in each of the first portion P1 and the second portion P2 of the housing 48. The space Rb of the housing 48 and the space Ra of the first flow channel substrate 32 are communicated with each other. The space constituted of the space Ra and the space Rb functions as a liquid storage chamber R for storing ink that is supplied to the multiple pressure chambers C. The liquid storage chamber R is a common liquid chamber that is used for the multiple nozzles N. The first portion P1 and the second portion P2 are each provided with the liquid storage chamber R. The liquid storage chamber R of the first portion P1 is located on the positive side in the X direction when viewed from the central plane O, and the liquid storage chamber R of the second portion P2 is located on the negative side in the X direction when viewed from the central plane O. An inlet port 482 for introducing the ink supplied from a liquid container 14 to the liquid storage chamber R is formed on the surface of the housing 48 on the opposite side to the first flow channel substrate 32.

As shown in FIG. 2, a vibration absorber 54 is disposed on the surface Fb of the first flow channel substrate 32 in each of the first portion P1 and the second portion P2. The vibration absorber 54 is a flexible film absorbing a change in the pressure of the ink in the liquid storage chamber R, i.e., a compliance substrate. For example, the vibration absorber 54 is disposed on the surface Fb of the first flow channel substrate 32 so as to occlude the space Ra of the first flow channel substrate 32 and the multiple supply channels 61 to constitute a wall, specifically, the bottom of the liquid storage chamber R.

As shown in FIG. 2, a space (hereinafter, referred to as "circulation liquid chamber") 65 is formed on the surface Fb of the first flow channel substrate 32 facing the nozzle plate 52. The circulation liquid chamber 65 of the first embodiment is a long bottomed hole extending in the Y direction in planar view. The opening of the circulation liquid chamber 65 is occluded by the nozzle plate 52 bonded to the surface Fb of the first flow channel substrate 32. The circulation liquid chamber 65 continues, for example, over the multiple nozzles N along the first line L1 and the second line L2. Specifically, the circulation liquid chamber 65 is formed between the arrangement of the multiple nozzles N of the first line L1 and the arrangement of the multiple nozzles N of the second line L2. Accordingly, the circulation liquid chamber 65 is located between the communication passages 63 of the first portion P1 and the communication passages 63 of the second portion P2. Thus, the flow channel forming portion 30 is a structure in which the pressure chambers C and the communication passages 63 in the first portion P1, the pressure chambers C and the communication passages 63 in the second portion P2, and the circulation liquid chamber 65 located between the communication passages 63 in the first portion P1 and the communication passages 63 in the second portion P2 are formed. As shown in FIG. 2, the flow channel forming portion 30 includes a wall-like portion (hereinafter, referred to as "partition wall") 69 that partitions between the circulation liquid chamber 65 and each communication passage 63.

Incidentally, as described above, multiple pressure chambers C and multiple piezoelectric elements 44 are arranged in the Y direction in each of the first portion P1 and the second portion P2. Accordingly, it is also possible to express that the circulation liquid chamber 65 extends in the Y direction to continue over the multiple pressure chambers C or the multiple piezoelectric elements 44 in each of the first portion P1 and the second portion P2. In addition, as shown in FIG. 2, the circulation liquid chambers 65 and the liquid storage chambers R extend in the Y direction with an interval therebetween, and it is also possible that the pressure chambers C, the communication passages 63, and the nozzles N are located in the interval.

FIG. 3 is a partial exploded cross-sectional view of the vicinity of a circulation liquid chamber 65 in the ink jet head 3. As shown in FIG. 3, one nozzle N in the embodiment includes a first section n1 and a second section n2. The first section n1 and the second section n2 are circular spaces coaxially formed and communicating with each other. The second section n2 is located on the flow channel forming portion 30 side when viewed from the first section n1. In the embodiment, the central axis Qa of each nozzle N is located on the opposite side to the circulation liquid chamber 65 when viewed from the central axis Qb of the communication passage 63. The inner diameter d2 of the second section n2 is larger than the inner diameter d1 of the first section n1. As described above, a structure in which the nozzles N are formed in a step like shape has an advantage that the flow channel resistance of each nozzle N can be easily set to desired characteristics. In the embodiment, the central axis Qa of each nozzle N is located on the opposite side to the circulation liquid chamber 65 when viewed from the central axis Qb of the communication passages 63.

As shown in FIG. 3, multiple exhaust passages 72 are formed on the surface of the nozzle plate 52 facing the flow channel forming portion 30 in each of the first portion P1 and the second portion P2. The multiple exhaust passages of the first portion P1 correspond one-to-one to the multiple nozzles N of the first line L1 or to the multiple communication passages 63 corresponding to the first line L1. In addition, the exhaust passages 72 of the second portion P2 correspond one-to-one to the multiple nozzles N of the second line L2 or the multiple communication passages 63 corresponding to the second line L2.

Each of the exhaust passages 72 is a groove extending in the X direction, i.e., a long bottomed hole, and functions as a flow channel for ink. The exhaust passages 72 of the first embodiment are formed at a position separated from the nozzles N, specifically, on the circulation liquid chamber 65 side when viewed from the nozzles N corresponding to the exhaust passages 72. For example, the multiple nozzles N, especially, the second section n2, and the multiple exhaust passages 72 are collectively formed by a common process by a semiconductor manufacturing technique, for example, a processing technique, such as dry etching and wet etching.

As shown in FIG. 3, each of the exhaust passages 72 is linearly formed with a flow channel width Wa equivalent to the inner diameter d2 of the nozzle N in the second section n2. In addition, the flow channel width Wa of the exhaust passage 72 in the first embodiment is smaller than the flow channel width Wb of the pressure chamber C. Accordingly, it is possible to increase the flow channel resistance of the exhaust passage 72, compared to the configuration in which the flow channel width Wa of the exhaust passage 72 is larger than the flow channel width Wb of the pressure chamber C. On the other hand, the depth Da of the exhaust passage 72 from the surface of the nozzle plate 52 is constant over the whole length. Specifically, each exhaust passage 72 is formed with a depth equivalent to the depth of the second section n2 of the nozzle N. The configuration described above has an advantage that the exhaust passages 72 and the second section n2 are easily formed, compared to the configuration in which the exhaust passages 72 and the second section n2 are formed with different depths from each other. Incidentally, the "depth" of the flow channel means the depth of the flow channel in the Z direction, for example, the difference in height between the flow channel-forming surface and the bottom of the flow channel.

One arbitrary exhaust passage 72 in the first portion P1 is located on the circulation liquid chamber 65 side when viewed from the nozzle N corresponding to the exhaust passage 72 in the first line L1. In addition, one arbitrary exhaust passage 72 in the second portion P2 is located on the circulation liquid chamber 65 side when viewed from the nozzle N corresponding to the exhaust passage 72 in the second line L2. The side of each exhaust passage 72 opposite to the central plane O overlaps one communication passage 63 corresponding to the exhaust passage 72 in planar view. That is, the exhaust passages 72 are communicated with the communication passages 63. On the other hand, the end of each exhaust passage 72 on the central plane O side overlaps the circulation liquid chamber in planar view. That is, the exhaust passages 72 are communicated with the circulation liquid chamber 65. Thus, the multiple communication passages 63 are each communicated with the circulation liquid chamber 65 through the exhaust passage 72. Accordingly, as indicated by the dashed line arrows in FIG. 3, the ink in each of the communication passages 63 is supplied to the circulation liquid chamber 65 through the exhaust passage 72. That is, in the embodiment, the multiple communication passages 63 corresponding to the first line L1 and the multiple communication passages 63 corresponding to the second line L2 are communicated in common with one circulation liquid chamber 65.

FIG. 3 shows the flow channel length La of the part of one arbitrary exhaust passage 72 overlapping the circulation liquid chamber 65, the flow channel length, i.e., the size Lb in the X direction, of the part of the exhaust passage 72 overlapping the communication passages 63, and the flow channel length, i.e., the size Lc in the X direction, of the part of the exhaust passage 72 overlapping the partition wall 69 of the flow channel forming portion 30. The flow channel length Lc corresponds to the thickness of the partition wall 69. The partition wall 69 functions as a throttle portion of the exhaust passage 72. Accordingly, the flow channel resistance of the exhaust passage 72 increases with the flow channel length Lc corresponding to the thickness of the partition wall 69. In the embodiment, a relationship that the flow channel length La is longer than the flow channel length Lb and that the flow channel length La is longer than the flow channel length Lc is established. Furthermore, in the embodiment, a relationship that the flow channel length Lb is longer than the flow channel length Lc is established. According to the configuration described above, there is an advantage that ink easily flows into the circulation liquid chamber 65 from the communication passage 63 through the exhaust passage 72, compared to a configuration in which the flow channel length La and the flow channel length Lb are shorter than the flow channel length Lc.

As described above, in the ink jet head 3, the pressure chamber C is indirectly communicated with the circulation liquid chamber 65 through the communication passage 63 and the exhaust passage 72. That is, the pressure chamber C and the circulation liquid chamber 65 are not directly communicated with each other. In the configuration described above, when the pressure in the pressure chamber C changes by the action of the piezoelectric element 44, a part of the ink flowing in the communication passage 63 is ejected from the nozzle N to the outside, and the remaining part of the ink flows into the circulation liquid chamber 65 from the communication passage 63 through the exhaust passage 72. The inertances of the communication passage 63, the nozzle, and the exhaust passage 72 are selected such that the ejection amount of the ink ejected through the nozzle N in the ink flowing in the communication passage 63 by one-time driving of the piezoelectric element 44 is larger than the circulating amount of the ink flowing in the circulation liquid chamber 65 through the exhaust passage 72 in the ink flowing in the communication passage 63. Assuming that all the piezoelectric elements 44 are driven at once, it is also possible to express that the sum of the circulating amounts flowing into the circulation liquid chamber 65 from the multiple communication passages 63, for example, the flow rate per unit time in the circulation liquid chamber 65, is larger than the sum of the injection amounts by the multiple nozzles N.

Specifically, the flow channel resistances of the communication passage 63, the nozzle, and the exhaust passage 72 are each determined such that the rate of the circulating amount of the ink based on the amount of the ink flowing in the communication passage 63 is 70% or more, that is, the rate of the ejection amount of the ink is 30% or less. According to the configuration described above, it is possible to effectively circulate the ink present in the vicinity of a nozzle in the circulation liquid chamber 65, while securing the ejection amount of the ink. Schematically, there is a tendency that the circulating amount decreases but the ejection amount increases with an increase in the flow channel resistance of the exhaust passage 72, in other words, the circulating amount increases but the ejection amount decreases with a decrease in the flow channel resistance of the exhaust passage 72.

For example, the printer 1 has a structure including a circulation mechanism (not shown). The circulation mechanism is a mechanism for supplying the ink in the circulation liquid chamber 65 to the liquid storage chamber R, i.e., circulating the ink. The circulation mechanism includes, for example, a suction mechanism for sucking the ink from the circulation liquid chamber 65, such as a pump, a filter mechanism (not shown) for collecting bubbles and foreign matter mixed in the ink, and a heating mechanism for heating the ink to reduce the thickening. The ink in which bubbles and foreign matter are removed and the thickening is reduced by the circulation mechanism is supplied to the liquid storage chamber R from the circulation mechanism through the inlet port 482. Consequently, the ink circulates in the path of liquid storage chamber R→supply channel 61→pressure chamber C→communication passage 63→exhaust passage 72→circulation liquid chamber 65→circulation mechanism→liquid storage chamber R. The supply channel 61 and the exhaust passage 72 are collectively referred to as a circulation passage.

Thus, when the exhaust passage 72 communicating between the communication passage 63 and the circulation liquid chamber 65 is formed in the nozzle plate 52, it is possible to efficiently circulate the ink present in the vicinity of the nozzle N in the circulation liquid chamber 65. In addition, since the communication passage 63 corresponding to the first line L1 and the communication passage 63 corresponding to the second line L2 are communicated in common with the circulation liquid chamber 65 between the both, there is also an advantage that the configuration of the liquid ejection head 26 is simplified, consequently, miniaturization is realized, compared to a configuration in which the circulation liquid chamber communicating with each of the exhaust passages 72 corresponding to the first line L1 and the circulation liquid chamber communicating with each of the exhaust passages 72 corresponding to the second line L2 are separately disposed.

In addition, the exhaust passage 72 and the nozzle N are not separated from each other and may be continuous with each other. Alternatively, in addition to the circulation liquid chamber 65, circulation liquid chambers corresponding to the first portion P1 and the second portion P2, respectively, may be formed.

The ink jet textile printing system according to the embodiment may include a drying means or a heating means (not shown). The drying means and the heating means are means for efficiently drying the process liquid or the ink adhered to fabric 2 in the ink jet textile printing method described below. The drying means and the heating means may be disposed at any position being capable of drying or heating the fabric 2. In order to efficiently dry the ink or the process liquid adhered to the fabric 2, for example, in an example shown in FIG. 1, the drying means and the heating means can be disposed at a position facing the ink jet head 3.

Examples of the drying means and the heating means include a print heater mechanism of bringing the fabric 2 into contact with a heat source for heating, a mechanism of irradiating the fabric 2 with, for example, infrared rays or microwaves that are electromagnetic waves having a maximum wavelength of about 2,450 MHz, and a dryer mechanism of blowing warm air to the fabric 2. Heating of the fabric 2 is performed before or when droplets discharged from the nozzles of the ink jet head 3 adhere to the fabric 2.

Various conditions for heating, for example, timing of heating implementation, heating temperature, and heating time, are controlled by a controller.

The drying means and the heating means may be disposed on the downstream side in the transportation direction of the fabric 2. In such a case, an image is formed by adhesion of the ink and process liquid discharged from nozzles to fabric 2, and the fabric 2 is then heated. Consequently, the drying properties of the ink and the process liquid adhered to fabric 2 are improved.

2. INK COMPOSITION

The ink composition to be used in the embodiment contains a pigment and an organic solvent. The ink composition contains 10.0 mass % or more and 55.0 mass % or less of a polyhydric alcohol solvent as the organic solvent. The ink composition to be used in the embodiment constitutes, together with a process liquid composition described below, an ink jet textile printing ink set according to the embodiment. In addition, the ink composition to be used in the embodiment is, together with a process liquid composition described below, used in an ink jet textile printing method for printing by adhesion to fabric. Incidentally, in the present specification, the ink composition may be an aqueous ink composition. Here, the term "aqueous ink composition" refers to an ink composition in which the content of water is 30 mass % or more based on the total mass of the ink composition.

The ink composition (hereinafter, also simply referred to as "ink") to be used in the embodiment will now be described.

2.1. Pigment

The ink composition to be used in the embodiment is a pigment textile printing ink composition including a pigment as the color material because that pigments can simplify the processes, such as the dyeing process and the washing process, compared to the use of dyes.

As the pigment, any of known organic pigments and inorganic pigments can be used. Examples of the organic pigment include azo pigments, such as azo lake pigments, insoluble azo pigments, condensed azo pigments, and chelate azo pigments; polycyclic pigments, such as phthalocyanine pigments, perylene pigments, perinone pigments, anthraquinone pigments, quinacridone pigments, dioxazine pigments, thioindigo pigments, isoindolinone pigments, isoindoline pigments, quinophthalone pigments, and diketopyrrolopyrrole pigments; dye lake pigments, such as basic dye lakes and acid dye lakes; and nitro pigments, nitroso pigments, aniline blacks, and daylight fluorescent pigments. Examples of the inorganic pigment include metal oxide pigments, such as titanium dioxide, zinc oxide, and chromium oxide; and carbon blacks. Alternatively, glitter pigments, such as pearl pigments and metallic pigments, may be used.

For example, examples of the black pigment for a black ink composition include C.I. Pigment Blacks 1, 7, and 11. C.I. means "Color Index Generic Name". As the black pigment for an ink jet textile printing, in particular, C.I. Pigment Black 7, which is a carbon black having a relatively low specific gravity and being less likely to precipitate in aqueous media, may be used.

Examples of the pigment for compositions other than the black ink composition include C.I. Pigment Yellows 1, 3, 12, 13, 14, 17, 24, 34, 35, 37, 42, 53, 55, 74, 81, 83, 95, 97, 98, 100, 101, 104, 108, 109, 110, 117, 120, 138, 153, 155, and 180; C.I. Pigment Reds 1, 2, 3, 5, 17, 22, 23, 31, 38, 48:2 (permanent red 2B (Ba)), 48:2 (permanent red 2B (Ca)), 48:3, 48:4, 49:1, 52:2, 53:1, 57:1, 60:1, 63:1, 63:2, 64:1, 81, 83, 88, 101, 104, 105, 106, 108, 112, 114, 122, 123, 146, 149, 166, 168, 170, 172, 177, 178, 179, 185, 190, 193, 209, and 219; C.I. Pigment Violets 19 and 23; C.I. Pigment Blues 1, 2, 15, 15:1, 15:2, 15:3, 15:4, 15:6, 16, 17:1, 56, 60, and 63; and C.I. Pigment Greens 1, 4, 7, 8, 10, 17, 18, and 36.

The above-mentioned pigments may be used alone or in combination of two or more thereof. The pigment may have an average particle diameter of 5 μm or less or 0.3 μm or less and may be 0.01 μm or more and 0.15 μm or less. When the average particle diameter of the pigment is within such a range, the stability of discharge from the ink jet head can be secured, and the color development properties of the pigment in printed matter can be improved.

In addition, in the embodiment, examples of the white pigment for a white ink composition include C.I. Pigment White 1 which is basic lead carbonate, C.I. Pigment White 4 which is composed of zinc oxide, C.I. Pigment White 5 which is composed of a mixture of zinc sulfide and barium sulfate, C.I. Pigment White 6 which is composed of titanium dioxide, C.I. Pigment White 6:1 which is composed of titanium dioxide and containing another metal oxide, C.I. Pigment White 7 which is composed of zinc sulfide, C.I. Pigment White 18 which is composed of calcium carbonate, C.I. Pigment White 19 which is composed of clay, C.I. Pigment White 20 which is composed of mica titanium, C.I. Pigment White 21 which is composed of barium sulfate, C.I. Pigment White 22 which is composed of gypsum, C.I. Pigment White 26 which is composed of magnesium oxide/silicon dioxide, C.I. Pigment White 27 which is composed of silicon dioxide, and C.I. Pigment White 28 which is composed of anhydrous calcium silicate. Among these pigments, C.I. Pigment White 6 which has, for example, excellent color development properties and latency may be used.

The white pigment may have an average particle diameter of 100 μm or more and 500 μm or less, 50 μm or more and 450 μm or less, or 200 μm or more and 400 μm or less. When the average particle diameter of the white pigment is within this range, the stability of discharge from the ink jet head can be secured. In addition, the concealability to the previously dyed color on fabric cloth is improved.

Incidentally, in the present specification, the "average particle diameter" means volume-based particle size distribution which is a particle diameter when the cumulative distribution is 50 vol % unless otherwise specified. The average particle diameter is measured by a dynamic light scattering method or a laser diffraction light scattering method described in JIS 28825. Specifically, a particle size analyzer (for example, "Microtrac UPA" manufactured by Nikkiso Co., Ltd.) using the dynamic light scattering method as the measurement principle can be employed.

In the embodiment, the lower limit of the content of the pigment contained in the ink composition varies depending on the type of the pigment used but may be 1 mass % or more, 3 mass % or more, or 4 mass % or more based on the total mass, i.e., 100 mass %, of the ink from the viewpoint of, for example, securing good color development properties. In addition, the upper limit of the content of the pigment may be 30 mass % or less, 15 mass % or less, or 12 mass % or less for securing the stability of discharge from the ink jet head.

The above-mentioned pigments may be used alone or in combination of two or more thereof. In order to enhance the dispersibility of the pigment in the ink composition, the pigment may be surface-treated, or the ink composition may contain, for example, a dispersant. The surface treatment of the pigment is a method for introducing a hydrophilic group, such as a carboxy group or a sulfo group, to the particle surface of the pigment by physical treatment or chemical treatment. The pigment can be dispersed in an aqueous medium, such as water, by surface treatment of the pigment.

The dispersant to be used in the aqueous medium has a function that the hydrophobic group, which is the hydrophobic moiety in the molecular structure, is adsorbed to the particle surface of the pigment and the hydrophilic group, which is the hydrophilic moiety, is oriented to the medium side. The pigment can be dispersed in an aqueous medium by this function. As the dispersant, a known surfactant or a polymer compound can be used. Alternatively, a method for adding dispersibility by covering pigment particles with, for example, a polymer compound may be used. As the method for covering pigment particles, for example, an acid precipitation method, a phase inversion emulsification method, or a miniemulsion polymerization method can be employed.

2.2. Organic Solvent

In the embodiment, the ink composition contains an organic solvent. The ink composition contains 10.0 mass % or more and 55.0 mass % or less of a polyhydric alcohol solvent as the organic solvent. In the embodiment, the ink composition can control the physical properties, such as viscosity and surface tension, and behaviors, such as drying and permeation, when applied to fabric by containing the organic solvent. Consequently, discharge stability and color development properties are improved. In addition, since the ink composition contains 10.0 mass % or more and 55.0 mass % or less of a polyhydric alcohol solvent and the process liquid composition described below contains a compound having one quaternary ammonium in its molecule, the color development properties are improved.

In the embodiment, examples of the polyhydric alcohol solvent include ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, 2-ethyl-1,3-hexanediol, and glycerol. Incidentally, polyhydric alcohols that are solids at 20° C. also have a function similar to that of the polyhydric alcohols functioning as the organic solvent and may be similarly used. Examples of the polyhydric alcohols that are solid at 20° C. include trimethylolpropane. The ink composition containing a polyhydric alcohol can suppress drying and solidification of the ink composition in the nozzles of the ink jet head and can reduce nozzle clogging, discharge defect, and so on.

The content of the polyhydric alcohol solvent in the ink composition is 10.0 mass % or more and 55.0 mass % or less based on the total mass of the ink composition. The lower limit may be 13.0 mass % or more, 15.0 mass % or more, or 17.0 mass % or more. In addition, the upper limit may be 50.0 mass % or less, 46.0 mass % or less, or 40.0 mass % or less.

In addition, in the embodiment, the content of the polyhydric alcohol solvent having a high boiling point of 210° C. or more as the polyhydric alcohol solvent in the ink composition may be 1.0 mass % or more, 3.0 mass % or more, or 5.0 mass % or more and may be 45.0 mass % or less, 40.0 mass % or less, or 30.0 mass % or less. When the content of the polyhydric alcohol solvent having a high boiling point is 1.0 mass % or more, the redissolvability of resin particles described below is improved, and the effect of reducing nozzle clogging, discharge defect, and so on is improved. In addition, when the content of the polyhydric alcohol solvent having a high boiling point is 45.0 mass % or less, the drying properties of the ink are improved, and the abrasion resistance of the image is improved.

In the embodiment, examples of the organic solvent other than the polyhydric alcohol solvent include 2-pyrrolidones, 1,2-alkanediols, and glycol ethers.

The 2-pyrrolidones are compounds having a 2-pyrrolidone skeleton. Examples of the 2-pyrrolidones include compounds having substituents, such as N-methyl-2-pyrrolidone, N-ethyl-2-pyrrolidone, and N-vinyl-2-pyrrolidone, in addition to 2-pyrrolidone not having a substituent. The substituent on the 2-pyrrolidone skeleton may be an organic group, such as a saturated or unsaturated hydrocarbon group having 1 to 5 carbon atoms. Among these compounds, 2-pyrrolidone, which shows excellent storage stability of the ink composition and has an excellent effect of suppressing generation of aggregates, may be used.

Examples of the 1,2-alkanediols include 1,2-propanediol, 1,2-butanediol, 1,2-pentanediol, 1,2-hexanediol, and 1,2-octanediol. The 1,2-alkanediols have an excellent function of enhancing the wettability of the ink composition to fabric to evenly wet the fabric. Accordingly, it is possible to form images with reduced blur. The content of the 1,2-alkanediols may be 1.0 mass % or more and 20.0 mass % or less based on the total mass of the ink composition.

Examples of the glycol ethers include alkylene glycol monoethers and alkylene glycol diethers.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol methyl ethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

When the ink composition contains a glycol ether, it is possible to control the wettability to fabric and the permeation rate. The content of the glycol ethers may be 0.05 mass % or more and 6.0 mass % or less based on the total mass of the ink composition.

2.3. Water

In the embodiment, the ink composition is an aqueous pigment ink composition containing water. When the ink composition is applied to fabric, water evaporates and scatters from the fabric by drying. The water to be used may be pure water, such as deionized water, ultrafiltration water, reverse osmosis water, and distilled water, or ultrapure water. In particular, water obtained by sterilizing the above-mentioned water by, for example, ultraviolet irradiation or hydrogen peroxide addition may be used from the viewpoint of preventing the generation of mold and bacteria over a long period of time.

Although the content of water in the ink composition is not particularly limited, the content may be 40.0 mass % or more and 90.0 mass % or less, 50 mass % or more and 80 mass % or less, or 55.0 mass % or more and 70.0 mass % or less.

2.4. Resin Particles

The pigment textile printing ink jet ink composition according to the embodiment may contain resin particles. The resin particles form a resin coating film by heating after recording to improve the fixity of the image formed by the ink composition. Consequently, the washing fastness and the friction fastness of the resulting image can be improved. Although the resin particles can be used either in an emulsion form or a solution form, from the viewpoint of suppressing an increase in the viscosity of the ink, the resin particles may be used in an emulsion form.

As the resin of the resin particles, for example, acrylic resins, styrene acrylic resins, fluorene resins, urethane resins, polyolefin resins, rosin modified resins, terpene resins, polyester resins, polyamide resins, epoxy resins, vinyl chloride resins, vinyl chloride-vinyl acetate copolymers, and ethylene vinyl acetate resins can be used. These resins may be used alone or in combination of two or more thereof.

In particular, as the resin of the resin particles, among the above-mentioned resins, at least one selected from urethane resins and acrylic resins may be used because they have a high freedom in design and readily provide desired physical properties. In particular, from the viewpoint of maintaining the texture of fabric and improving the abrasion resistance, in the embodiment, a urethane resin may be used. The urethane resin may be any urethane resin, such as a polyether urethane resin having an ether bond, a polyester urethane resin having an ester bond, and a polycarbonate urethane resin having a carbonate bond. Among these resins, the urethane resin having a polycarbonate skeleton or a polyether skeleton has a good balance between the fracture point elongation and 100% modulus and can readily improve the abrasion resistance of an image and the texture of printed matter. In addition, the polycarbonate urethane resin having a polycarbonate skeleton tends to be able to give high abrasion resistance.

Commercially available examples of such urethane resins include TAKELAC WS-6021 (trade name, manufactured by Mitsui Chemicals & SKC Polyurethanes Inc., polyether polyurethane resin emulsion), WS-5100 (trade name, manufactured by Mitsui Chemicals & SKC Polyurethanes Inc., polycarbonate urethane resin emulsion), W-6110 (trade name, manufactured by Mitsui Chemicals & SKC Polyurethanes Inc., polycarbonate urethane resin emulsion), ELASTRON series E-37 and H-3 (trade names, manufactured by DKS Co., Ltd., polyester polyurethane resin emulsion), ELASTRON series H-38, BAP, C-52, F-29, and W-11P (trade names, manufactured by DKS Co., Ltd., polyether polyurethane resin emulsion), SUPERFLEX series 870, 800, 150, 420, 460, 470, 610, and 700 (trade name, manufactured by DKS Co., Ltd., urethane resin emulsion), PERMARINE UA-150 (trade name, manufactured by Sanyo Chemical Industries, Ltd., urethane resin emulsion), Sancure 2710 (trade name, manufactured by The Lubrizol Corporation, urethane resin emulsion), NeoRez series R-9660, R-9637, and R-940 (trade name, manufactured by Kusumoto Chemicals, Ltd., urethane resin emulsion), and Adeka Bontiter series HUX-380 and 290K (trade name, manufactured by ADEKA Corporation, urethane resin emulsion).

Examples of the acrylic resin emulsion include VONCOAT (registered trademark) series AN-402, R-3310, R-3360, and 4001 (trade names, manufactured by DIC Corporation), Polyzole (registered trademark) series AM-710, 920, 2300, AP-4735, AT-860, and PSASE-4210E (trade names, manufactured by Showa Denko K.K.), SAIVINOL (registered trademark) SK-200 (manufactured by Saiden Chemical Industry Co., Ltd.), AE-120A (trade name, manufactured by JSR Corporation), VINYBLAN (registered trademark) series 2650, 2680, 2682, 2684, 2886, and 5202 (trade names, manufactured by Nissin Chemical Co., Ltd.), and NK Binder R-5HN (trade name, manufactured by Shin-Nakamura Chemical Co., Ltd.).

In the embodiment, the content of the resin particles may be 1.0 mass % or more, 2.5 mass % or more, or 3.0 mass % or more in terms of solid content based on the total mass of the ink. The upper limit of the content of the resin particles may be 20.0 mass % or less, 15.0 mass % or less, or 12.0 mass % or less. When the content of the resin particles is within the above-mentioned range, printed matter having excellent color development properties is obtained, and the discharge stability and the storage stability are further improved.

In the ink jet textile printing method according to the embodiment described below, when process liquid is used, the above-mentioned resin particles may be contained in the process liquid. In such a case, the resin particles contained in the process liquid and the resin particles contained in the ink composition may be the same or different.

2.5. Surfactant

In the embodiment, the ink composition may include a surfactant. The surfactant can be used as a wetting agent that reduces the surface tension of the ink composition to control the wettability to fabric, i.e., the permeability to fabric. In addition, when the ink composition contains a surfactant, the stability of discharge from the ink jet head is secured, and the ink composition readily comes into contact with the component of the process liquid adhered to the fabric.

The surfactant may be any of nonionic surfactants, anionic surfactants, cationic surfactants, and amphoteric surfactants and may be a combination thereof. Among these surfactants, an acetylene glycol surfactant, a silicone surfactant, or a fluorosurfactant may be used.

Examples of the acetylene glycol surfactant include, but not limited to, SURFYNOL (registered trademark) series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, manufactured by Nissin Chemical Co., Ltd.), OLFINE (registered trademark) series B, Y, P, A, STG, SPC, E1004, E1010, PD-001, PD-002W, PD-003, PD-004, PD-005, EXP.4001, EXP.4300, EXP.4036, EXP.4051, AF-103, AF-104, AK-02, SK-14, and AE-3 (trade names, manufactured by Nissin Chemical Co., Ltd.), and ACETYLENOL (registered trademark) series E00, E00P, E40, and E100 (trade names, manufactured by Kawaken Fine Chemicals Co., Ltd.).

The silicone surfactant is not particularly limited and may be a polysiloxane compound. The polysiloxane compound is not particularly limited and may be, for example, a polyether modified organosiloxane. Commercially available examples of the polyether modified organosiloxane include BYK (registered trademark)-306, BYK-307, BYK-333, BYK-341, BYK-345, BYK-346, and BYK-348 (trade names, manufactured by BYK Chemie GmbH), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

The fluorosurfactant may be a fluorine modified polymer, and examples thereof include, but not limited to, BYK (registered trademark)-340 (trade name, manufactured by BYK-Chemie Japan K.K.).

When the ink composition contains a surfactant, two or more of the above-mentioned surfactants can be used, and the total content thereof may be 0.01 mass % or more and 3 mass % or less, 0.05 mass % or more and 2 mass % or less, 0.1 mass % or more and 1.5 mass % or less, or 0.2 mass % or more and 1 mass % or less based on the total mass of the ink.

2.6. Other Additives 2.6.1. Chelating Agent

In the embodiment, the ink composition may contain an appropriate amount of a chelating agent for removing unnecessary ions in the ink. Examples of the chelating agent include ethylenediaminetetraacetic acids and salts thereof, such as sodium dihydrogen ethylenediaminetetraacetate or nitrilotriacetates, hexametaphosphates, pyrophosphates, or metaphosphates of ethylenediamine. When the ink composition contains a chelating agent, the content of the chelating agent can be 0.01 mass % or more and 1 mass % or less based on the total mass of the ink.

2.6.2. pH Adjuster

In the embodiment, the ink composition may contain a pH adjuster in order to adjust the pH. The pH adjuster is not particularly limited, and examples thereof include acids, bases, weak acids, and weak bases, and appropriate combinations thereof, specifically, tertiary alkanolamines, such as triethanolamine and triisopropanolamine. When a pH adjuster is contained, for example, the content thereof may be 0.01 mass % or more and 2 mass % or less, 0.1 mass % or more and 1 mass % or less, or 0.2 mass % or more and 0.5 mass % or less based on the total mass of the ink composition.

2.6.3. Preservative and Fungicide

In the embodiment, the ink composition may appropriately contain a preservative and a fungicide. Examples of the preservative and the fungicide include sodium benzoate, sodium pentachlorophenol, sodium 2-pyridinethiol-1-oxide, sodium sorbate, sodium dehydroacetate, 1,2-dibenzoisothiazolin-3-one such as PROXEL series CRL, BDN, GXL, XL-2, TN, and LV available from Lonza Japan Ltd., and 4-chloro-3-methylphenol such as PREVENTOL (registered trademark) CMK available from Bayer Holding Ltd.

2.6.4. Others

The ink composition may further contain, in addition to the components above, for example, additives that can usually be used in ink jet ink, for example, a rust preventive such as benzotriazole, an antioxidant, a UV absorber, an oxygen absorber, and a dissolution aid.

2.7. Method for Preparing Ink Composition

In the embodiment, the ink composition is prepared by mixing each component described above in an arbitrary order and removing impurities by, for example, filtration as necessary. As the method for mixing each component, a method in which materials are successively added to a container equipped with a stirrer, such as a mechanical stirrer or a magnetic stirrer, and are stirred and mixed is appropriately used. As the filtration, for example, centrifugal filtration or filter filtration can be performed as necessary.

2.8. Physical Properties of Ink Composition 2.8.1. Surface Tension

In the embodiment, the ink composition may have a surface tension at 20° C. of 20 mN/m or more and 40 mN/m or less or 30 mN/m or more and 36 mN/m or less from the viewpoint of the balance between the textile printing quality and reliability as ink jet ink. When the surface tension is within the range above, in ink jet textile printing, the discharge stability is excellent, and the ink readily uniformly wets fabric and spreads on the fabric at the time when the ink adheres to the fabric and easily permeates. Consequently, the ink readily fixes to the fabric.

The surface tension can be measured using, for example, an automatic surface tension meter CBVP-Z (trade name, manufactured by Kyowa Interface Science Co., Ltd.) by checking the surface tension when a platinum plate is wetted with ink under an environment of 20° C. In one example of the method for adjusting the surface tension within the above-mentioned range, the types of the organic solvent and the surfactant described above and the contents thereof and water are appropriately adjusted.

2.8.2. Viscosity

The viscosity at 20° C. of the ink may be 1.5 mPa·s or more and 10 mPa·s or less, 2 mPa·s or more and 8 mPa·s or less, or 4 mPa·s or more and 5.5 mPa·s or less. When the viscosity at 20° C. of the ink is within the above-mentioned range, the ink adhered to fabric is further easily fixed, and the color development properties are improved.

The viscosity can be measured by, for example, using a viscoelasticity measuring apparatus MCR-series (trade name, manufactured by Anton Paar GmbH). In one example of the method for adjusting the viscosity within the above-mentioned range, the types of the organic solvent and the surfactant described above and the contents thereof and water are appropriately adjusted.

3. PROCESS LIQUID COMPOSITION

The process liquid composition used in the embodiment constitutes, together with the above-described ink composition, an ink jet textile printing ink set and is used for printing through adhesion to fabric by an ink jet method. In the embodiment, the process liquid composition contains a cationic compound and a compound having one quaternary ammonium in its molecule (hereinafter, also simply referred to as "specific quaternary ammonium compound").

The process liquid composition (hereinafter, also simply referred to as "process liquid") used in the embodiment will now be described.

Incidentally, the process liquid composition to be used in the embodiment is used by previously adhering to fabric as a base material of printed matter in ink jet textile printing.

3.1. Cationic Compound

The process liquid composition to be used in the embodiment contains a cationic compound. The cationic compound has a function of aggregating the components in the ink composition. Accordingly, when the ink composition adheres to the fabric to which the process liquid adhered, the cationic compound enhances aggregation of the ink particles or increases the viscosity of the ink to suppress absorption into apertures or inside of the fibers constituting the fabric. Thus, since the cationic compound retains the ink on the surface of fabric, the color development properties of the ink in the printed matter are improved. In addition, blur and bleeding are suppressed.

The above-described function of the cationic compound is derived from the function of neutralizing the surface charge of the component contained in the ink composition or the function of changing the pH of the ink composition. By these functions, it is possible to aggregate or precipitate the components such as the pigment in the ink composition and to thicken the ink composition.

Examples of the cationic compound include multivalent metal salts and cationic resins. Among these compounds, multivalent metal salts may be used from the viewpoint of improving the color development properties of the pigment and being suitable for cotton fabric. These cationic compounds may be used alone or in combination of two or more thereof.

A multivalent metal salt is composed of a divalent or higher metal ion and an anion that binds to the multivalent metal ion and is a compound soluble in water. Examples of the multivalent metal ion include divalent metal ions, such as $Ca^{2+}$, $Cu^{2+}$, $Ni^{2+}$, $Mg^{2+}$, $Zn^{2+}$, and $Ba^{2+}$; and trivalent metal ions, such as $Al^{3+}$, $Fe^{3+}$, and $Cr^{3+}$. Examples of the anion include $Cl^-$, $I^-$, $Br^-$, $SO_4^{2-}$, $ClO^{3-}$, $NO^{3-}$, $HCOO^-$, and $CH_3COO^-$. Among these multivalent metal salts, from the viewpoint of stability of the process liquid and reactivity as an aggregating agent, the multivalent metal salt may be a calcium salt or a magnesium salt, in particular, either calcium nitrate or calcium chloride.

Among these multivalent metal salts composed of multivalent metal cations and anions, calcium salts, such as calcium chloride and calcium nitrate, may be used from the viewpoint of storage stability of process liquid and improving the color development properties by the aggregation action on the pigment or resin microparticles. The multivalent metal salts may be used alone or in combination of two or more thereof.

In addition to the multivalent metal salts, a metal salt other than multivalent metal salts may be used. Examples of such metal salts include monovalent metal cations, such as $Na^-$ and $K^-$, and combinations with the above-mentioned anions, such as sodium sulfate and potassium sulfate.

Examples of the cationic resin include cationic urethane resins, olefin resins, and allylamine resins, where compounds having one quaternary ammonium in the molecule are excluded.

As the cationic urethane resin, a known or commercially available product can be used. The cationic urethane resin may be used as a solution dissolved in a solvent such, as water or an organic solvent, or as an emulsion dispersed in such a solvent. Examples of the cationic urethane resin include HYDRAN (registered trademark) series CP-7010, 7120, 7030, 7040, 7050, 7060, and 7610 (trade names, manufactured by DIC Corporation), SUPERFLEX (registered trademark) series 600, 610, 620, 630, 640, and 650 (trade names, manufactured by DKS Co., Ltd.), and Urethane Emulsion series WBR-2120C and 2122C (trade names, manufactured by Taisei Fine Chemical Co., Ltd.).

The cationic olefin resin is a polymer compound having a structure, such as an ethylene chain or a propylene chain, derived from an olefin monomer as the main skeleton. As the cationic olefin resin, a known or commercially available product can be used, and the cationic olefin resin may be used as a solution dissolved in a solvent, such as water or an organic solvent, or as an emulsion dispersed in such a solvent. Examples of the cationic olefin resin include ARROWBASE (registered trademark) series CB-1200 and CD-1200 (trade names, manufactured by Unitika Ltd.).

As the cationic allylamine resin, a known cationic allylamine resin can be used, and examples thereof include polyallylamine hydrochloride, polyallylamineamide sulfate, allylamine hydrochloride-diallylamine hydrochloride copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamineamide sulfate, polymethyldiallylamine acetate, polydiallyldimethylammonium chloride, diallylamine acetate-sulfur dioxide copolymers, diallylmethylethylammoniumethyl sulfate-sulfur disulfide copolymers, methyldiallylamine hydrochloride-sulfur disulfide copolymers, diallyldimethylammonium chloride-sulfur disulfide copolymers, and diallyldimethylammonium chloride-acrylamide copolymers.

As the cationic allylamine resin, a commercially available product may be used, and examples thereof include PAA-HCL-01, 03, 05, 3L, and 10L; PAA-H-HCL; PAA-SA; PAA-01, 03, 05, 08, 15, 15C, and 25; PAA-H-10C; PAA-D11-HCL; PAA-D41-HCL; PAA-D19-HCL; PAS-21CL, 22SA, 92, and 92A; PAS-M-1, 1L, and 1A; PAS-H-1L, 5L, and 10L; and PAS-J-81 and 81L (trade names, manufactured by Nittobo Medical Co., Ltd.); and Himoloc (registered trademark) series NEO-600, Q-101, Q-311, and Q-501, and Himax SC-505 (trade names, manufactured by Hymo Corporation).

Furthermore, in addition to the above-mentioned cationic resins and multivalent metal salts, as another cationic compound, a cationic surfactant, an inorganic acid, or an organic acid may be used.

Examples of the cationic surfactant include primary, secondary, and tertiary amine salt compounds, alkylamine salts, dialkylamine salts, fatty acid amine salts, benzalkonium salts, quaternary ammonium salts, quaternary alkylammonium salts, alkylpyridinium salts, sulfonium salts, phosphonium salts, onium salts, and imidazolinium salts. Specifically, examples of the cationic surfactant include hydrochlorides or acetates of laurylamine, coconutamine, and rosinamine, dodecyltrimethylammonium chloride (lauryltrimethylammonium chloride), hexadecyltrimethylammonium chloride (cetyltrimethylammonium chloride), benzyltributylammonoium chloride, benzalkonium chloride, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammmonium chloride. These cationic surfactants may be commercially available ones.

Examples of the inorganic acid or the organic acid include inorganic acids, such as sulfuric acid, hydrochloric acid, nitric acid, and phosphoric acid; organic acids, such as polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid, and nicotinic acid; and derivatives or salts of these compounds. These compounds may be used alone or in combination of two or more thereof.

As other cationic compounds, for example, inorganic pigments, such as chalk, kaolin, calcined clay, talc, titanium oxide, zinc oxide, zinc sulfide, synthetic silica, aluminum hydroxide, alumina, sericite, white carbon, saponite, calcium montmorillonite, sodium montmorillonite, and bentonite; and organic pigments, such as acrylic plastic pigments and urea polymer compounds, may be used.

The content of the cationic compound contained in the process liquid is not particularly limited and may be 0.1 mass % or more, 2.0 mass % or more, or 5.0 mass % or more based on the total mass of the process liquid. The content of the cationic compound contained in the process liquid may be 40.0 mass % or less, 25.0 mass % or less, or 10.0 mass % or less based on the total mass of the process liquid. When the content of the cationic compound is within the above-mentioned range, precipitation or separation of the cationic compound in the process liquid is suppressed, and aggregation of the pigment and resin microparticles in the ink is accelerated to suppress absorption into apertures or inside of the fibers constituting the fabric. Consequently, the phenomenon that the color material penetrates in the rear surface direction of the printing surface is reduced, and the color development properties of the printed matter are improved.

3.2. Compound Having One Quaternary Ammonium in its Molecule

The process liquid composition to be used in the embodiment contains a compound having one quaternary ammonium in its molecule (hereinafter, also simply referred to as "specific quaternary ammonium compound"). In the embodiment, when the process liquid contains such a specific quaternary ammonium compound, the OH group of the polyhydric alcohol solvent in the ink and the ammonium cation electrically interact with each other to readily retain the ink in the vicinity of the ammonium cation. Consequently, the ink is easily retained on the surface of fabric, and the color development properties on the fabric are improved.

Examples of the specific quaternary ammonium compound include betaines. The term "betaine" refers to a compound that has a positive charge and a negative charge in one molecule and does not have charge as the whole molecule. Examples of such a compound include an inner salt compound having a positive charge, such as a quaternary ammonium cation, and a negative charge, such as a carboxylate anion, at positions that are not adjacent to each other in one molecule wherein no dissociable hydrogen atom bonds to the atom having the positive charge.

Examples of the betaine include lysine betaine, ornithine betaine, homarine, trigonelline, alanine betaine, taurobetaine, phenylalanyl betaine carnitine, homoserine betaine, valine betaine, trimethylglycine, stachydrine, γ-butyrobetaine, lauryldimethylaminoacetic acid betaine, laurylhydroxysulfobetaine, stearyldimethylaminoacetic acid betaine, lauric acid amidopropyl betaine, palm acid amidopropyl betaine, and glutamic acid betaine. Among these betaines, from the viewpoint of a function of capturing a cationic compound, at least one selected from carnitine, trimethylglycine, and γ-butyrobetaine, in particular, trimethylglycine may be used. These betaines may be commercially available ones.

When the process liquid contains a cationic compound for improving the color development properties, there is a risk of generating a treatment mark derived from a reaction between the cationic compound in the process liquid and a component contained in fabric. Here, the term "treatment mark" refers to a visually recognizable change in appearance that occurs as a change in hue of the fabric color when the surface of the fabric has a region where the process liquid has adhered to and a region where the process liquid has not adhered to.

It is presumed that in the process liquid, at least a certain amount of the cationic compound is captured by the specific quaternary ammonium compound. In the embodiment, the reaction between the cationic compound and a component contained in fabric is suppressed by that the process liquid contains the specific quaternary ammonium compound. This is because that the cationic compound is captured by the specific quaternary ammonium compound and less likely causes a reaction with a component contained in fabric. The cationic compound captured by the specific quaternary ammonium compound is released from the specific quaternary ammonium compound by textile printing using ink after the pretreatment with the process liquid, and the reaction with the ink component progresses to improve the color development properties. Thus, in the embodiment, the process liquid contains a specific quaternary ammonium compound, and thereby not only the color development properties are improved, but also generation of treatment marks can be suppressed than before. Consequently, the quality of appearance of the resulting printed matter is improved.

The content of the specific quaternary ammonium compound in the process liquid may be 3.0 mass % or more, 3.5 mass % or more, or 5.0 mass % or more based on the total mass of the process liquid. The content of the specific quaternary ammonium compound in the process liquid may be 12.0 mass % or less, 11.0 mass % or less, or 10.0 mass % or less based on the total mass of the process liquid. Consequently, the process liquid is appropriately prevented from permeating to the inside of fabric to provide an ink retention effect and to improve the color development properties. When the content is lower than the lower limit, the ink retention effect may be insufficient, and when the content is higher than the upper limit, the process liquid may permeate in the fabric. Thus, in both cases, good color development properties are less likely obtained. When the content is not higher than the upper limit, fluffing of fabric is suppressed to improve the appearance of the printed matter. Furthermore, the difference in the adhesion amount when the process liquid is applied to fabric, i.e., occurrence of application unevenness, can be suppressed.

The relationship between the content of the specific quaternary ammonium compound in the process liquid and the content of the cationic compound described below may be within a specific range. Specifically, the mass ratio of the content of the cationic compound to the content of the specific quaternary ammonium compound may be 0.2 or more, 0.5 or more, or 0.7 or more. In addition, the mass ratio of the content of the cationic compound to the content of the specific quaternary ammonium compound may be 2.3 or less, 2.1 or less, or 1.9 or less. When the content ratio between the cationic compound and the specific quaternary ammonium compound is as described above, the ink retention effect due to the specific quaternary ammonium compound is obtained, occurrence of penetration to the rear surface is reduced, and the color development properties of the printed matter are improved.

The suitable content of the betaine in the process liquid also varies depending on the color of fabric to which the ink is applied. In application to fabric dyed to black or blue, the mass ratio of the content of the cationic compound to the content of the specific quaternary ammonium compound may be 1.25 or more and 2.0 or less. In application to fabric dyed to red, the mass ratio of the content of the cationic compound to the content of the specific quaternary ammonium compound may be 0.6 or more and 1.25 or less.

3.3. Water

In the embodiment, the main solvent of the process liquid may be water. The water is a component that evaporates and scatters by drying after adhesion of the process liquid to fabric as the recording medium. As the water, since those exemplified in the ink composition described above can be used, the exemplification thereof is omitted. The content of water in the process liquid may be, for example, 40 mass % or more, 50 mass % or more, or 60 mass % or more based on the total mass of the process liquid. In addition, the content of water in the process liquid may be, for example, 95 mass % or less, 90 mass % or less, or 85 mass % or less based on the total mass of the process liquid. When the content of water is within the above-mentioned range, an increase in the viscosity of the process liquid is suppressed, and the usability of the process liquid in adhesion to fabric and the drying properties after the adhesion can be improved. The water in the process liquid includes water contained a raw material of the process liquid, for example, water mixed with resin particles described below.

3.4. Resin Particles

The process liquid may contain resin particles. When the process liquid contains resin particles, the fixity of the pigment contained in the ink composition to fabric can be further improved. In addition, the resin particles may be used as a filling agent for suppressing excessive permeation of the process liquid and the ink composition into the inside of fabric.

Examples of the resin particles include those exemplified as the resin particles in the ink composition.

The content of the resin particles contained in the process liquid may be 1.0 mass % or more and 20.0 mass % or less, 1.5 mass % or more and 15.0 mass % or less, or 2.0 mass % or more and 10.0 mass % or less in terms of solid content based on the total mass of the process liquid. When the content of the resin particles in terms of solid content is within the above-mentioned range, an increase in the viscosity of the process liquid is suppressed, and the abrasion resistance, such as washing fastness and friction fastness, of the printed matter is improved.

3.5. Surfactant

In the embodiment, the process liquid may contain a surfactant. When the surfactant is contained, it is possible to reduce the surface tension of the process liquid and to improve the wettability to fabric. As the surfactant, as exemplified in the ink composition, an acetylene glycol surfactant, a silicone surfactant, or a fluorosurfactant may be used. Examples of the surfactant include those exemplified as the surfactant in the ink composition. The content of the surfactant is not particularly limited and can be 0.1 mass % or more and 1.5 mass % or less based on the total mass of the process liquid.

3.6. Other Components

The process liquid to be used in the embodiment may contain a pH adjuster, a preservative/fungicide, a rust preventive, a chelating agent, etc. as necessary, as in the ink composition descried above. Examples of other components include those exemplified as other components in the ink composition.

3.7. Method for Preparing Process Liquid

In the embodiment, the process liquid can be prepared by mixing each component described above in an arbitrary order and removing impurities and foreign matter by, for example, filtration as necessary. As the method for mixing each component, a method in which materials (components) are successively added to a container equipped with a stirrer, such as a mechanical stirrer or a magnetic stirrer, and are stirred and mixed is appropriately used. As the filtration, for example, centrifugal filtration or filter filtration can be performed.

3.8. Physical Properties of Process Liquid

The physical properties of the process liquid are arbitrarily adjusted according to the type of the fabric and the method for adhesion to fabric.

3.8.1. Surface Tension

In the embodiment, when the process liquid is discharged by an ink jet recording head, the surface tension at 20° C. may be 20 mN/m or more and 40 mN/m or less or 30 mN/m or more and 36 mN/m or less. When the surface tension is within this range, the discharge stability is excellent, and the process liquid readily uniformly wets fabric and spreads on the fabric at the time when the process liquid adheres to the fabric and easily permeates. The surface tension can be measured as in the ink.

3.8.2. Viscosity

In the embodiment, when the process liquid is discharged by an ink jet recording head, the viscosity at 20° C. of the process liquid may be 1.5 mPa·s or more and 10 mPa·s or less, 2 mPa·s or more and 8 mPa·s or less, or 4 mPa·s or more and 5.5 mPa·s or less. When the viscosity at 20° C. of the process liquid is within the above-mentioned range, the process liquid adhered to fabric further easily fixes to the fabric. The viscosity can be measured as in the ink.

4. INK JET TEXTILE PRINTING INK SET

The ink jet textile printing ink set according to the embodiment is composed of the above-described ink composition and the above-described process liquid composition. That is, the ink jet textile printing ink set according to the embodiment includes an ink composition and a process liquid composition, wherein the process liquid composition contains a cationic compound and a compound having one quaternary ammonium in its molecule, and the ink composition contains a pigment and an organic solvent, where the organic solvent is a polyhydric alcohol solvent and the content thereof is 10.0 mass % or more and 55.0 mass % or less.

In the embodiment, as described above, since the process liquid composition contains a cationic compound and a compound having one quaternary ammonium in its molecule, the ink is readily retained on the surface of fabric by the assembly effect of the polyhydric alcohol solvent, in addition to aggregation of the resin particles in the ink. Consequently, the effect of aggregating the ink is enhanced, the ink is retained on the surface of fabric, and the color development properties are improved.

The effects of the ink jet textile printing ink set according to the embodiment are notable, in particular, in textile printing to cotton fabric, and not only the color development properties are improved, but also treatment marks are suppressed to improve the appearance. Furthermore, fluffing is suppressed, and printed matter having excellent abrasion resistance is obtained. In addition, when the ink set is used in an ink jet textile printing system including a recording apparatus having an ink jet head provide with a circulation passage for circulating the ink composition, the ink set can show excellent discharge stability.

5. FABRIC

The ink jet textile printing method according to the embodiment described below is performed to fabric. The material constituting the fabric is not particularly limited, and examples thereof include natural fibers, such as cotton, hemp, wool, and silk; synthetic fibers, such as polypropylene, polyester, acetate, triacetate, polyamide, and polyurethane; and biodegradable fibers, such as polylactic acid. The fabric may be blended fibers thereof. In the embodiment, when the ink set described above is used in textile printing to cotton fabric, the color development properties are improved, and the treatment marks are suppressed to improve the appearance. In addition, fluffing is suppressed, and printed matter having excellent abrasion resistance is obtained.

The fabric may be any of the above-mentioned fibers formed into, for example, any of woven fabric, knitted fabric, and nonwoven fabric. In addition, the weight per unit area of the fabric that is used in the embodiment is also not particularly limited and may be 1.0 oz or more and 10.0 oz or less, 2.0 oz or more and 9.0 oz or less, 3.0 oz or more and 8.0 oz or less, or 4.0 oz or more and 7.0 oz or less. When the weight per unit area of the fabric is within such a range, satisfactory recording can be performed. Furthermore, the ink jet textile printing method according to the embodiment can be applied to multiple types of fabric having different weights per unit area, and satisfactory printing can be performed. In addition, the ink jet textile printing method according to the embodiment can satisfactorily print with a small front and back color difference even on thick cloth.

In the embodiment, examples of the form of the fabric include cloth, garments, and other clothing ornaments. The cloth includes, for example, woven fabric, knitted fabric, and nonwoven fabric. The garments and other clothing ornaments include sewn T-shirts, handkerchiefs, scarves, towels, carrier bags; cloth bags, curtains, sheets, and bedspreads; furniture such as wallpaper; and cut or uncut cloth as parts before sewing. Examples of these forms of fabric include a long one wound in a roll shape, one cut into a predetermined size, and one having a product shape. In addition, it is only necessary that the above-described process liquid adheres to the fabric, the fabric may be one to which the process liquid is applied in advance.

The weight per unit area of the fabric may be 1.0 oz or more and 10.0 oz or less, 2.0 oz or more and 9.0 oz or less, 3.0 oz or more and 8.0 oz or less, or 4.0 oz or more and 7.0 oz or less. In the embodiment, since the components, such as a cationic compound, of the process liquid are appropriately arranged on the fabric having a weight per unit area within the above-mentioned range, the color development properties can be improved than before. In addition, the process liquid can be used for multiple types of fabric having different weights per unit area.

As the fabric, cotton fabric colored in advance with a dye may be used. In the embodiment, since the process liquid can suppress generation of treatment marks while securing the color development properties, it can be suitably used for garments and other clothing ornaments, in particular, previously dyed cotton T-shirts. That is, even if the cloth is dyed, it is possible to perform textile printing with good color development properties and with suppressed generation of treatment marks, and it is therefore possible to increase the quality and product value of printed matter as a product than before.

Examples of the dye with which fabric is dyed in advance include water-soluble dyes, such as acid dyes and basic dyes; disperse dyes combined with dispersants; and reactive dyes. When cotton fabric is used, a reactive dye suitable for dyeing cotton may be used.

6. INK JET TEXTILE PRINTING METHOD

An ink jet textile printing method according to the embodiment will now be described. The ink jet textile printing method of the embodiment performs textile printing by discharging droplets of an ink composition with the above-described printer 1 (see FIG. 1) by an ink jet method and applying the droplets onto fabric 2 to form an image or the like.

Specifically, the ink jet textile printing method according to the embodiment includes a process liquid adhesion step of adhering the process liquid of the ink jet textile printing ink set according to the embodiment described above to fabric 2; and an ink adhesion step of discharging the ink composition of the ink jet textile printing ink set according to the embodiment from the nozzles of an ink jet head to adhere the ink composition to the fabric to which the process liquid adhered.

6.1. Process Liquid Adhesion Step

In the process liquid adhesion step, the process liquid is adhered to at least a partial region of fabric. Examples of the method for adhering the process liquid include immersion coating in which fabric is immersed in the process liquid; roller coating in which the process liquid is adhered using a brush, roller, spatula, roll coater, etc.; spray coating in which the process liquid is ejected with a spray device, etc.; and ink jet coating in which the process liquid is adhered by an ink jet method. In the embodiment, any method can be employed in the process liquid adhesion step, and a combination of multiple methods may be used. In particular, immersion coating, roller coating, and spray coating may be used because of their simplicity in the device structure and quickness of adhesion of the process liquid.

In the process liquid adhesion step, the amount of the process liquid adhered to fabric may be 100 mg/inch$^2$ or more and 3,000 mg/inch$^2$ or less, 130 mg/inch$^2$ or more and 15,000 mg/inch$^2$ or less, or 193 mg/inch$^2$ or more and 500 mg/inch$^2$ or less per unit area of the fabric. When the adhesion amount of the process liquid is 0.02 g/cm$^2$, i.e., 129 mg/inch$^2$ or more, since the process liquid is relatively uniformly adhered to fabric, occurrence of uneven coloring, etc. in textile printing using the ink composition is reduced. In addition, when the adhesion amount of the process liquid is 0.5 g/cm$^2$, i.e., 3,226 mg/inch$^2$ or less, generation of blur in textile printing using the ink composition is reduced.

In the process liquid adhesion step, the adhesion amount of the cationic compound contained in the process liquid to fabric may be 7.5 µmol/cm$^2$ or more and 40 µmol/cm$^2$ or less or 12 µmol/cm$^2$ or more and 30 µmol/cm$^2$ or less per unit area of the fabric. When the adhesion amount of the cationic compound is 10 µmol/cm$^2$ or more, the color development properties in textile printing using the ink composition are improved. In addition, when the adhesion amount of the cationic compound is 40 µmol/cm$^2$ or less, the washing fastness of the printed matter is improved.

In addition, after the process liquid adhesion step, a drying step of drying fabric may be performed. The process liquid may be dried by air-drying or heat-drying, and heat-drying which can shorten the drying time may be employed. The heating method in the heat-drying is not particularly limited, and examples thereof include a heat press method, a normal-pressure steam method, a high-pressure steam method, and a thermofix method. The heat source for heating is not particularly limited, and, for example, an infrared lamp can be used.

The heating temperature in the heat-drying is desirably a temperature at which not only the solvent, such as water, contained in the process liquid volatilizes but also the resin particles contained in the process liquid develop a binding force to the fabric fibers by the anchor effect due to a decrease in melt viscosity by the heating. Specifically, the temperature is, but not particularly limited to, about 100° C. or more and about 200° C. or less. Here, the heating temperature in the heat-drying is the surface temperature of the process liquid adhered to fabric and can be measured with, for example, a non-contact thermometer IT2-80 (trade name, manufactured by Keyence Corporation). The heating time for heating is, for example, 30 seconds or more and 20 minutes or less.

In the embodiment, since the process liquid contains a specific quaternary ammonium compound, the cationic compound is captured by the specific quaternary ammonium compound. Consequently, in the process liquid adhesion step and the drying step, even if the process liquid and the fabric are in contact with each other, the reaction between the cationic compound and the component contained in the fabric less likely occurs to suppress generation of treatment marks.

6.2. Ink Adhesion Step

In the ink adhesion step, droplets of the ink composition discharged from the above-described ink jet head (see FIG. 1) are landed on the fabric in at least part of the region to which the process liquid is adhered. On this occasion, the components, such as the pigment, in the ink composition react with the cationic compound released from the capture by the specific quaternary ammonium compound in the process liquid, the ink components, such as the pigment, aggregate in the vicinity of the surface of the fabric 2. Consequently, the pigment less likely penetrates in the inside direction of the fabric 2, the color development properties of the ink are improved compared to the case of not using a cationic compound.

In addition, in the embodiment, when the ink jet method is used in the ink adhesion step, for example, a plate necessary for analog textile printing, such as screen textile printing, is not required, and not only the application to small-volume production in great varieties is easy but also high-definition images, text, patterns, colors, etc. can be formed.

In the ink adhesion step, the adhesion amount of the ink to the fabric 2 may be 1.5 $mg/cm^2$ or more and 6 $mg/cm^2$ or less or 2 $mg/cm^2$ or more and 5 $mg/cm^2$ or less per unit area of the fabric 2. When the adhesion amount of the ink is within the above-mentioned range, the color development properties of, for example, an image formed by textile printing are improved. In addition, the drying properties of the ink adhered to the fabric 2 are secured, and generation of blur in, for example, an image is reduced. When at first an undercoat is formed by, for example, a white ink composition on a previously dyed fabric, an adhesion amount higher than the above-mentioned amount of the white ink composition may be adhered.

After the ink adhesion step, a step of heating the ink adhered to the fabric 2 may be performed. The heating step may employ the same heating method as that in the above-described drying step. The heating temperature when the ink contains resin particles may be a temperature at which the resin particles are fused and the medium such as water volatilizes. For example, the heating temperature is about 100° C. or more and about 200° C. or less. Here, the heating temperature in the heating step is the surface temperature of the image or the like formed on the fabric 2. The heating temperature can be measured by the same method as that in the drying step. The heating time is not particularly limited and is, for example, 30 seconds or more and 20 minutes or less.

After the heating step, a step of water-washing and drying the fabric 2 subjected to the textile printing may be performed. In the water-washing, components, such as the ink, that have not been fixed to the fabric 2 may be washed away using a hot soap solution or the like, as a soaping process, as necessary. By the steps described above, printed matter is manufactured.

In the embodiment, the process liquid adhesion step and the ink adhesion step may be performed as a series of steps, or storage, transportation, or another step may be performed between the process liquid adhesion step and the ink adhesion step.

As described above, according to the ink jet textile printing method of the embodiment, the color development properties are improved. In addition, generation of treatment marks is suppressed, and the quality of appearance of the resulting printed matter can be improved. Furthermore, fluffing is suppressed to give printed matter having excellent abrasion resistance. In addition, although an ink composition containing a large amount of a polyhydric alcohol solvent and containing resin particles readily generates foreign matter at the gas-liquid interface, the ink circulates to less likely generate foreign matter by using an ink jet head having a circulation passage for circulating the ink composition. Consequently, in the embodiment, even in the case of readily generating foreign matter, an ink jet textile printing method showing excellent discharge stability can be performed.

7. EXAMPLES

The present disclosure will now be further specifically described by examples and comparative examples but is not limited to the examples. Incidentally, the "part(s)" and "%" in the examples and the comparative examples are based on mass unless otherwise specified.

7.1. Preparation of Ink Composition

Component were each put in a container so as to have a composition shown in Table 1, and mixed and stirred with a magnetic stirred for 2 hours, and then further subjected to distribution treatment with a bead mill filled with zirconia beads having a diameter of 0.3 mm for sufficient mixing. After stirring for 1 hour, filtration through a 5-µm PTFE membrane filter was performed to give inks 1 to 20. The numerical values in Table 1 indicate mass %, and deionized water was added so that the total mass of each ink was 100 mass %.

Among the components shown in Table 1, details of the components shown by names other than compound names are as follows.

Pigment
  White pigment: titanium dioxide (C.I. Pigment White 6)
  Resin particles
  TAKELAC (registered trademark) W-6110 (trade name, manufactured by Mitsui Chemicals & SKC Polyurethanes Inc., polycarbonate urethane resin)
  TAKELAC (registered trademark) WS-5100 (trade name, manufactured by Mitsui Chemicals & SKC Polyurethanes Inc., polycarbonate urethane resin)
  TAKELAC (registered trademark) WS-6021 (trade name, manufactured by Mitsui Chemicals & SKC Polyurethanes Inc., polyether urethane resin)
  VINYBLAN 2682 (trade name, manufactured by Nissin Chemical Co., Ltd., acrylic resin)
  Surfactant
  BYK (registered trademark)-348 (trade name, manufactured by BYK-Chemie Japan K.K., polyether modified siloxane surfactant)

Here, titanium dioxide slurry NanoTek (R) Slurry (trade name, manufactured by C.I. TAKIRON Corporation, titanium dioxide, solid content: 20 mass %, average particle diameter: 250 nm) was added to the titanium dioxide (C.I. Pigment White 6) used as the white pigment. In Table 1, the contents as titanium dioxide slurry are shown, and the solid content of titanium dioxide in each ink is 10 mass %. In Table 1, the contents of resin particles show the contents of resin particles in terms of solid content.

TABLE 1

| | | Ink 1 | Ink 2 | Ink 3 | Ink 4 | Ink 5 |
|---|---|---|---|---|---|---|
| Ink | Pigment | 10.0 | 10.0 | 10.0 | 10.0 | 10.0 |
| | Resin particles TAKELAC W-6110 (polycarbonate urethane resin) | 10.0 | 10.0 | | | |
| | TAKELAC WS-5100 (polycarbonate urethane resin) | | | 10.0 | | |
| | TAKELAC WS-6021 (polyether urethane resin) | | | | 10.0 | |
| | VINYBLAN 2682 (acrylic resin) | | | | | 10.0 |
| | Solvent 1,3-Butanediol (b.p. 207° C.) | | 12.0 | | | |
| | Glycerol (b.p. 290° C.) | 4.0 | 4.0 | 4.0 | 4.0 | 4.0 |
| | 2-Ethyl-1,3-hexanediol (b.p. 243° C.) | 1.0 | 1.0 | 1.0 | 1.0 | 1.0 |
| | 3-Methyl-1,3-butanediol (b.p. 203° C.) | 12.0 | | 12.0 | 12.0 | 12.0 |
| | Surfactant BYK340 | 0.5 | 0.5 | 0.5 | 0.5 | 0.5 |
| | Water Deionized water | Balance | Balance | Balance | Balance | Balance |
| | Total amount of polyhydric alcohol | 17.0 | 17.0 | 17.0 | 17.0 | 17.0 |
| | Total amount of polyhydric alcohol (1) having high boiling point (b.p. 200° C. to 210° C.) | 12.0 | 12.0 | 12.0 | 12.0 | 12.0 |
| | Total amount of polyhydric alcohol (2) having high boiling point (b.p. 210° C. or more) | 5.0 | 5.0 | 5.0 | 5.0 | 5.0 |

| | | Ink 6 | Ink 7 | Ink 8 | Ink 9 | Ink 10 |
|---|---|---|---|---|---|---|
| Ink | Pigment | 10.0 | 10.0 | 10.0 | 10.0 | 10.0 |
| | Resin particles TAKELAC W-6110 (polycarbonate urethane resin) | 3.0 | 15.0 | 10.0 | 10.0 | 10.0 |
| | TAKELAC WS-5100 (polycarbonate urethane resin) | | | | | |
| | TAKELAC WS-6021 (polyether urethane resin) | | | | | |
| | VINYBLAN 2682 (acrylic resin) | | | | | |
| | Solvent 1,3-Butanediol (b.p. 207° C.) | 12.0 | 12.0 | 13.0 | | |
| | Glycerol (b.p. 290° C.) | 4.0 | 4.0 | 0.5 | 0.8 | 6.0 |
| | 2-Ethyl-1,3-hexanediol (b.p. 243° C.) | 1.0 | 1.0 | 0.3 | 0.3 | 1.0 |
| | 3-Methyl-1,3-butanediol (b.p. 203° C.) | 11.0 | 11.0 | 13.0 | 12.0 | 12.0 |
| | Surfactant BYK340 | 0.5 | 0.5 | 0.5 | 0.5 | 0.5 |
| | Water Deionized water | Balance | Balance | Balance | Balance | Balance |
| | Total amount of polyhydric alcohol | 28.0 | 28.0 | 26.8 | 13.1 | 19.0 |
| | Total amount of polyhydric alcohol (1) having high boiling point (b.p. 200° C. to 210° C.) | 23.0 | 23.0 | 26.0 | 12.0 | 12.0 |
| | Total amount of polyhydric alcohol (2) having high boiling point (b.p. 210° C. or more) | 5.0 | 5.0 | 0.8 | 1.1 | 7.0 |

| | | Ink 11 | Ink 12 | Ink 13 | Ink 14 | Ink 15 |
|---|---|---|---|---|---|---|
| Ink | Pigment | 10.0 | 10.0 | 10.0 | 10.0 | 10.0 |
| | Resin particles TAKELAC W-6110 (polycarbonate urethane resin) | 10.0 | 10.0 | 10.0 | 10.0 | 10.0 |
| | TAKELAC WS-5100 (polycarbonate urethane resin) | | | | | |
| | TAKELAC WS-6021 (polyether urethane resin) | | | | | |
| | VINYBLAN 2682 (acrylic resin) | | | | | |
| | Solvent 1,3-Butanediol (b.p. 207° C.) | | | | | |
| | Glycerol (b.p. 290° C.) | 45.0 | 1.0 | 10.0 | 40.0 | 15.0 |
| | 2-Ethyl-1,3-hexanediol (b.p. 243° C.) | 1.0 | 1.0 | 1.0 | | |
| | 3-Methyl-1,3-butanediol (b.p. 203° C.) | | 9.0 | 43.0 | | |
| | Surfactant BYK340 | 0.5 | 0.5 | 0.5 | 0.5 | 0.5 |
| | Water Deionized water | Balance | Balance | Balance | Balance | Balance |
| | Total amount of polyhydric alcohol | 46.0 | 11.0 | 54.0 | 40.0 | 15.0 |
| | Total amount of polyhydric alcohol (1) having high boiling point (b.p. 200° C. to 210° C.) | 0.0 | 9.0 | 43.0 | 0.0 | 0.0 |
| | Total amount of polyhydric alcohol (2) having high boiling point (b.p. 210° C. or more) | 46.0 | 2.0 | 11.0 | 40.0 | 15.0 |

| | | Ink 16 | Ink 17 | Ink 18 | Ink 19 | Ink 20 |
|---|---|---|---|---|---|---|
| Ink | Pigment | 10.0 | 10.0 | 10.0 | 10.0 | 10.0 |
| | Resin particles TAKELAC W-6110 (polycarbonate urethane resin) | 10.0 | 10.0 | | 10.0 | 10.0 |
| | TAKELAC WS-5100 (polycarbonate urethane resin) | | | | | |
| | TAKELAC WS-6021 (polyether urethane resin) | | | | | |
| | VINYBLAN 2682 (acrylic resin) | | | | | |
| | Solvent 1,3-Butanediol (b.p. 207° C.) | 24.0 | 26.0 | | | 20.0 |
| | Glycerol (b.p. 290° C.) | | | 4.0 | 4.0 | 10.0 |
| | 2-Ethyl-1,3-hexanediol (b.p. 243° C.) | | | 1.0 | 1.0 | 1.0 |
| | 3-Methyl-1,3-butanediol (b.p. 203° C.) | 25.0 | 26.0 | 12.0 | 4.0 | 26.0 |
| | Surfactant BYK340 | 0.5 | 0.5 | 0.5 | 0.5 | 0.5 |
| | Water Deionized water | Balance | Balance | Balance | Balance | Balance |
| | Total amount of polyhydric alcohol | 49.0 | 52.0 | 17.0 | 9.0 | 57.0 |
| | Total amount of polyhydric alcohol (1) having high boiling point (b.p. 200° C. to 210° C.) | 49.0 | 52.0 | 12.0 | 4.0 | 46.0 |
| | Total amount of polyhydric alcohol (2) having high boiling point (b.p. 210° C. or more) | 0.0 | 0.0 | 5.0 | 5.0 | 11.0 |

7.2. Preparation of Process Liquid

The components shown in Table 2 were mixed to prepare process liquids 1 to 14. Specifically, the components were each put in a container and were mixed and stirred with a magnetic stirrer for 2 hours, followed by filtration through a PTFE membrane filter with a pore size of 5 μm. The numerical values in Table 2 indicate mass %, and deionized water was added so that the total mass of each process liquid was 100 mass %. In Table 2, the contents of the resin particles and UNISENCE KHE104L are the contents in terms of solid content. In Table 2, the "cationic compound/specific quaternary ammonium compound" shows the content ratio of the cationic compound to the compound having one quaternary ammonium in its molecule (specific quaternary ammonium compound).

Among the components shown in Table 2, details of the components shown by names other than compound names are as follows.

Cationic Compound
UNISENCE KHE104L (trade name, manufactured by Senka Corporation, cationic resin composed of dimethylamine-epichlorohydrin condensation product)

Resin Particles
Movinyl 966A (trade name, manufactured by Japan Coating Resin Corporation, resin emulsion)

Surfactant
SURFYNOL (registered trademark) 485 (trade name, manufactured by Nissin Chemical Co., Ltd., nonionic surfactant)

the application method, and the process liquid was sufficiently impregnated into a sponge roller. Subsequently, the sponge roller was rolled on the surface of the breast region (one side) of the T-shirt three or four times in each of the horizontal direction and the vertical direction substantially perpendicular to the horizontal direction to uniformly apply the process liquid so that the adhesion amount was about 20 g per A4 size area. Each T-shirt to which the process liquid was applied was heat-dried using a heat press machine (manufactured by Asahi Textile Machinery Co., Ltd., AF-54TEN, lower trowel size: 500×400 mm) at 170° C. for 45 seconds. On this occasion, the pressing force of the heat pressing was 4.5 kN. As the T-shirt cloth, the following two types were used.

T-Shirt Cloth
Cotton (manufactured by TOMS Co., Ltd., Printstar Heavy Weight, Black, Cotton 100%)

PES (manufactured by TOMS Co., Ltd., Glimmer ACTIVE WEAR 3.5 oz Dry T-shirt, Black, Polyester 100%)

7.3.2. Textile Printing

Next, textile printing with the inks prepared above was performed on the process liquid-applied region of each T-shirt by an ink jet method using an ink jet printer (trade name "SC-F2000", manufactured by Seiko Epson Corporation). On this occasion, the textile printing conditions of the ink jet printer were an image dissolution of 1,440×1,440 dpi (dots per inch) and an ink adhesion amount of 200 mg/inch$^2$. Subsequently, heat-drying was performed using the heat press machine at 170° C. for 45 seconds at a pressing force

TABLE 2

|   |   |   | Process Liquid 1 | Process Liquid 2 | Process Liquid 3 | Process Liquid 4 | Process Liquid 5 | Process Liquid 6 | Process Liquid 7 |
|---|---|---|---|---|---|---|---|---|---|
| Process Liquid | Cationic compound | Calcium nitrate tetrahydrate | 8.0 | 8.0 | 8.0 |  |  |  | 8.0 |
|  |  | Calcium nitrate dihydrate |  |  |  | 8.0 | 8.0 | 8.0 |  |
|  |  | UNISENCE KHE104L |  |  |  |  |  |  |  |
|  | Resin particles | Movinyl 966A | 2.0 | 2.0 | 2.0 | 2.0 | 2.0 | 2.0 | 2.0 |
|  | Specific quaternary ammonium compound | Carnitine | 5.0 |  |  | 5.0 |  |  |  |
|  |  | Trimethylglycine |  | 5.0 |  |  | 5.0 |  | 3.5 |
|  |  | γ-Butyrobetaine |  |  | 5.0 |  |  | 5.0 |  |
|  | Surfactant | SURFYNOL 485 | 1.0 | 1.0 | 1.0 | 1.0 | 1.0 | 1.0 | 1.0 |
|  | Water | Deionized water | Balance | Balance | Balance | Balance | Balance | Balance | Balance |
|  | Cationic compound/specific quaternary ammonium compound |  | 1.6 | 1.6 | 1.6 | 1.6 | 1.6 | 1.6 | 2.3 |

|   |   |   | Process Liquid 8 | Process Liquid 9 | Process Liquid 10 | Process Liquid 11 | Process Liquid 12 | Process Liquid 13 | Process Liquid 14 |
|---|---|---|---|---|---|---|---|---|---|
| Process Liquid | Cationic compound | Calcium nitrate tetrahydrate | 8.0 |  | 8.0 | 8.0 | 8.0 |  |  |
|  |  | Calcium nitrate dihydrate |  |  |  |  |  | 8.0 |  |
|  |  | UNISENCE KHE104L |  | 10.0 |  |  |  |  | 10.0 |
|  | Resin particles | Movinyl 966A | 2.0 | 2.0 | 2.0 | 2.0 | 2.0 | 2.0 | 2.0 |
|  | Specific quaternary ammonium compound | Carnitine |  |  | 5.0 |  |  |  |  |
|  |  | Trimethylglycine | 11.0 |  |  | 3.0 | 12.0 |  |  |
|  |  | γ-Butyrobetaine |  |  |  |  |  |  |  |
|  | Surfactant | SURFYNOL 485 | 1.0 | 1.0 | 1.0 | 1.0 | 1.0 | 1.0 | 1.0 |
|  | Water | Deionized water | Balance | Balance | Balance | Balance | Balance | Balance | Balance |
|  | Cationic compound/specific quaternary ammonium compound |  | 0.7 | 2.0 | 2.7 | 0.7 | — | — | — |

7.3. Production of Printed Matter

7.3.1. Pretreatment

Commercially available T-shirt cloth was prepared as dyed fabric for evaluation, and the process liquids prepared above were applied thereto. Roller coating was employed as of 4.5 kN. Incidentally, in Tables 3 and 4 below, in the examples using a head having a circulation mechanism, the head of the ink jet printer was replaced with the head having a circulation passage for circulating ink composition shown in FIGS. 2 and 3 described above.

TABLE 3

| | | Example 1 | Example 2 | Example 3 | Example 4 | Example 5 | Example 6 | Example 7 | Example 8 | Example 9 |
|---|---|---|---|---|---|---|---|---|---|---|
| Combination | Fabric | Cotton | Cotton | Cotton | Cotton | Cotton | Cotton | Cotton | Cotton | Cotton |
| | Ink | 1 | 1 | 1 | 1 | 1 | 1 | 1 | 1 | 2 |
| | Process Liquid | 1 | 2 | 3 | 4 | 5 | 6 | 7 | 8 | 1 |
| | Circulation mechanism | Absence | Absence | Absence | Absence | Absence | Absence | Absence | Absence | Absence |
| Evaluation | Color development | B | A | B | B | B | B | B | B | B |
| | Treatment mark | B | A | B | B | A | B | C | C | B |
| | Fluffing | A | A | A | A | A | A | A | B | A |
| | Abrasion resistance | A | A | B | A | A | A | A | B | A |
| | Discharge stability | A | A | A | A | A | A | A | A | A |

| | | Example 10 | Example 11 | Example 12 | Example 13 | Example 14 | Example 15 | Example 16 | Example 17 |
|---|---|---|---|---|---|---|---|---|---|
| Combination | Fabric | Cotton | Cotton | Cotton | Cotton | Cotton | Cotton | Cotton | Cotton |
| | Ink | 3 | 4 | 5 | 6 | 7 | 8 | 9 | 10 |
| | Process Liquid | 1 | 1 | 1 | 1 | 1 | 1 | 1 | 1 |
| | Circulation mechanism | Absence | Absence | Absence | Absence | Absence | Absence | Absence | Absence |
| Evaluation | Color development | B | B | B | B | B | B | B | B |
| | Treatment mark | B | B | B | B | B | B | B | B |
| | Fluffing | A | A | A | B | A | A | A | A |
| | Abrasion resistance | A | B | C | C | A | B | B | B |
| | Discharge stability | A | A | A | A | C | C | A | A |

| | | Example 18 | Example 19 | Example 20 | Example 21 | Example 22 | Example 23 | Example 24 | Example 25 | Example 26 |
|---|---|---|---|---|---|---|---|---|---|---|
| Combination | Fabric | Cotton | Cotton | Cotton | Cotton | Cotton | Cotton | Cotton | Cotton | Cotton |
| | Ink | 11 | 12 | 13 | 8 | 14 | 15 | 16 | 17 | 18 |
| | Process Liquid | 1 | 1 | 1 | 1 | 1 | 1 | 1 | 1 | 1 |
| | Circulation mechanism | Absence | Absence | Absence | Presence | Absence | Absence | Absence | Absence | Absence |
| Evaluation | Color development | B | C | C | B | B | B | B | B | B |
| | Treatment mark | B | B | B | B | B | B | B | B | B |
| | Fluffing | B | A | B | A | B | A | B | B | A |
| | Abrasion resistance | C | B | C | B | C | B | C | C | D |
| | Discharge stability | B | A | A | A | A | A | B | C | A |

| | | Example 27 | Example 28 | Example 29 | Example 30 | Example 31 | Example 32 | Example 33 | Example 34 |
|---|---|---|---|---|---|---|---|---|---|
| Combination | Fabric | Cotton | Cotton | Cotton | Cotton | Cotton | Cotton | Cotton | Cotton |
| | Ink | 2 | 3 | 4 | 5 | 6 | 7 | 8 | 9 |
| | Process Liquid | 2 | 2 | 2 | 2 | 2 | 2 | 2 | 2 |
| | Circulation mechanism | Absence | Absence | Absence | Absence | Absence | Absence | Absence | Absence |
| Evaluation | Color development | A | A | A | A | A | A | A | A |
| | Treatment mark | A | A | A | A | A | A | A | A |
| | Fluffing | A | A | A | A | B | A | A | A |
| | Abrasion resistance | A | B | B | C | C | A | B | B |
| | Discharge stability | A | A | A | A | A | C | C | A |

| | | Example 35 | Example 36 | Example 37 | Example 38 | Example 39 | Example 40 | Example 41 | Example 42 | Example 43 |
|---|---|---|---|---|---|---|---|---|---|---|
| Combination | Fabric | Cotton | Cotton | Cotton | Cotton | Cotton | Cotton | Cotton | Cotton | Cotton |
| | Ink | 10 | 11 | 12 | 13 | 14 | 15 | 16 | 17 | 18 |
| | Process Liquid | 2 | 2 | 2 | 2 | 2 | 2 | 2 | 2 | 2 |
| | Circulation mechanism | Absence | Absence | Absence | Absence | Absence | Absence | Absence | Absence | Absence |
| Evaluation | Color development | A | A | B | A | A | A | A | A | A |
| | Treatment mark | A | A | A | A | A | A | A | A | A |
| | Fluffing | A | A | A | A | B | A | B | B | A |
| | Abrasion resistance | B | B | B | C | C | B | C | C | D |
| | Discharge stability | A | C | A | A | A | A | B | C | A |

TABLE 3-continued

|  |  | Example 44 | Example 45 | Example 46 | Example 47 | Example 48 | Example 49 | Example 50 | Example 51 |
|---|---|---|---|---|---|---|---|---|---|
| Combination | Fabric | Cotton | Cotton | Cotton | Cotton | Cotton | Cotton | PES | PES |
|  | Ink | 1 | 1 | 1 | 1 | 7 | 7 | 1 | 1 |
|  | Process Liquid | 9 | 10 | 11 | 1 | 7 | 8 | 1 | 4 |
|  | Circulation mechanism | Absence | Absence | Absence | Presence | Absence | Absence | Absence | Absence |
| Evaluation | Color development | C | C | B | B | B | B | C | C |
|  | Treatment mark | B | C | C | B | C | C | D | D |
|  | Fluffing | A | A | B | A | A | A | A | A |
|  | Abrasion resistance | B | A | C | A | B | B | C | C |
|  | Discharge stability | A | A | A | A | C | C | A | A |

TABLE 4

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Combination | Fabric | Cotton | Cotton | Cotton | Cotton | Cotton | Cotton | Cotton |
|  | Ink | 1 | 1 | 6 | 6 | 7 | 7 | 8 |
|  | Process Liquid | 12 | 13 | 12 | 13 | 12 | 13 | 12 |
|  | Circulation mechanism | Absence | Absence | Absence | Absence | Absence | Absence | Absence |
| Evaluation | Color development | D | D | D | D | D | D | D |
|  | Treatment mark | D | D | D | D | D | D | D |
|  | Fluffing | A | A | B | B | A | A | A |
|  | Abrasion resistance | B | B | B | B | B | B | B |
|  | Discharge stability | A | A | A | A | C | C | C |

|  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| Combination | Fabric | Cotton | Cotton | Cotton | Cotton | Cotton | Cotton | PES |
|  | Ink | 11 | 19 | 19 | 20 | 20 | 1 | 1 |
|  | Process Liquid | 12 | 1 | 12 | 1 | 12 | 14 | 12 |
|  | Circulation mechanism | Absence | Absence | Absence | Absence | Absence | Absence | Absence |
| Evaluation | Color development | D | D | D | D | D | E | D |
|  | Treatment mark | D | B | D | B | D | B | D |
|  | Fluffing | B | A | A | C | C | A | A |
|  | Abrasion resistance | C | B | B | D | D | B | C |
|  | Discharge stability | C | C | C | B | B | A | A |

7.4. Test for Evaluation

The resulting fabric was subjected to the following tests for evaluation.

7.4.1. Evaluation of Color Development

The color of the textile printed region of each fabric was measured as an index of the color development properties of a white pigment, i.e., whiteness. The fabric after textile printing was subjected to measurement of the L* value in the CIE/L*a*b* color system using a commercially available colorimeter (product name: "Gretag Macbeth Spectrolino", manufactured by X-Rite Inc.) and was evaluated by the following evaluation criteria. When the evaluation result is C or higher, it can be determined that the effect of the present disclosure has been obtained.

(Evaluation Criteria)

A: L*≥90,
B: 90>L'≥85,
C: 85>L'≥80,
D: 80>L'≥75, and
E: 75>L*.

7.4.2. Evaluation of Treatment Mark

The pretreated fabric was evaluated for the difference in visual appearance between the unpretreated region and the pretreated region according to the following evaluation criteria. An evaluation result of C or higher is better.

(Evaluation Criteria)

A: No difference in appearance is observed,
B: Almost no difference in appearance is observed,
C: A slight difference in appearance is observed, and
D: A notable difference in appearance is observed.

7.4.3. Evaluation of Fluffing

The textile printed region of each fabric was evaluated by counting the number of voids in 10 cm² of the image after drying and according to the following evaluation criteria. An evaluation result of B or higher is better.

(Evaluation Criteria)

A: 0,
B: one or more and less than ten, and
C: ten or more.

7.4.4. Evaluation of Abrasion Resistance

The color migration when the textile printed region of each fabric was rubbed with white cloth was visually observed and evaluated by the following evaluation criteria. An evaluation result of B or higher is better.

(Evaluation Criteria)

A: Color migration to the friction cloth is slightly observed,

B: Color migration to the friction cloth is observed,

C: Color migration to the friction cloth is notably observed, and

D: Color migration to the friction cloth is clearly observed.

7.4.5. Evaluation of Discharge Stability

The textile printed region of each fabric was visually observed and evaluated by the following evaluation criteria. An evaluation result of B or higher is better.

(Evaluation Criteria)

A: Deviation in the landing positions is observed but is naturally recovered to show high discharge reliability, B: Deviation in the landing positions is observed but is not a practical problem, and C: Dot omission occurs.

7.5. Evaluation Results

In every Comparative Examples 1 to 8, 10, 12, and 13 in which the process liquid does not contain a specific quaternary ammonium compound, the results were that the color development properties were low and treatment marks remained. In also Comparative Examples 9 and 11 in which the polyhydric alcohol solvent of the ink was outside the range in the present disclosure, the color development properties were low.

In contrast, in every Examples, the results were that the color development properties were high. The results will be specifically described.

Examples 1 to 8 and 44 to 46 are examples using the same ink, ink 1, but using different process liquids. When trimethylglycine was used as the specific quaternary ammonium compound and the content thereof was 3.5 mass % or more and 11.0 mass % or less based on the total mass of the process liquid composition, the color development and the effect of reducing treatment marks were high.

Examples 9 to 43 are examples using different inks for process liquid 1 or 2. When the ink contained polycarbonate urethane resin as the resin particles at a higher content, the abrasion resistance was high. In contrast, when the content of resin was low and the content of the solvent having a high boiling point of 210° C. or more was high, the discharge stability tended to be increased. In addition, when trimethylglycine was used as the specific quaternary ammonium compound, the color development and the effect of reducing treatment marks were high, compared to when carnitine was used.

As shown by Examples 15 and 21, even when the content of the high-boiling-point solvent was low and the discharge stability was reduced by generation of foreign matter, the discharge stability was maintained by using a head having a circulation mechanism.

As shown by Examples 50 and 51 and Comparative Example 14, even when PES was used as the fabric, the color development was high in Examples, but generation of treatment marks was not improved.

The present disclosure is not limited to the above-described embodiments and can be variously modified. For example, the present disclosure includes configurations that are substantially the same as the configurations described in the embodiments (for example, configurations that have the same functions, methods, and results, or configurations that have the same purposes and effects). In addition, the present disclosure includes configurations in which non-essential parts of the configurations described in the embodiments are replaced. The present disclosure also includes configurations that achieve the same effects or the same purposes as those by the configurations described in the embodiments. The present disclosure further includes configurations obtained by adding known techniques to the configurations described in the embodiments.

What is claimed is:

1. An ink jet textile printing ink set comprising:
   an ink composition; and
   a process liquid composition,
   wherein the process liquid composition contains a cationic compound and a compound having one quaternary ammonium in a molecule;
   the compound having one quaternary ammonium in the molecule includes trimethylglycine, and
   the ink composition contains a pigment and an organic solvent, the organic solvent being a polyhydric alcohol solvent and a content of the polyhydric alcohol solvent being 10.0 mass % or more and 55.0 mass % or less.

2. The ink jet textile printing ink set according to claim 1, wherein a content of the compound having one quaternary ammonium in the molecule is 3.5 mass % or more and 11.0 mass % or less based on a total mass of the process liquid composition.

3. The ink jet textile printing ink set according to claim 1, wherein a content mass ratio of the cationic compound to the compound having one quaternary ammonium in the molecule is 0.7 or more and 2.3 or less.

4. The ink jet textile printing ink set according to claim 1, wherein the ink composition further comprises a resin particle.

5. The ink jet textile printing ink set according to claim 4, wherein the resin particle contained in the ink composition is a polycarbonate urethane resin particle.

6. The ink jet textile printing ink set according to claim 1, wherein the ink composition contains 1.0 mass % or more and 45.0 mass % or less of a solvent having a boiling point of 210° C. or more as the polyhydric alcohol solvent.

7. The ink jet textile printing ink set according to claim 1, wherein the ink jet textile printing ink set is used for recording on cotton fabric.

8. An ink jet textile printing system comprising:
   a process liquid adhesion unit that adheres a process liquid composition containing a cationic compound and a compound having one quaternary ammonium in a molecule to fabric, the compound having one quaternary ammonium in the molecule including trimethylglycine; and
   an ink jet textile printing apparatus that comprises
      an ink jet head including a nozzle for discharging an ink composition containing a pigment and an organic solvent, the organic solvent being a polyhydric alcohol solvent and a content of the polyhydric alcohol solvent being 10.0 mass % or more and 55.0 mass % or less, to adhere the ink composition to the fabric and a circulation passage for circulating the ink composition.

9. An ink jet textile printing method comprising:
   a process liquid adhesion step of adhering a process liquid composition containing a cationic compound and a compound having one quaternary ammonium in a molecule to fabric, the compound having one quaternary ammonium in the molecule including trimethylglycine; and
   an ink adhesion step of discharging an ink composition containing a pigment and an organic solvent from a nozzle of an ink jet head to adhere the ink composition to the fabric, where the organic solvent is a polyhydric alcohol solvent and a content of the polyhydric alcohol solvent is 10.0 mass % or more and 55.0 mass % or less.

* * * * *